US008248246B2

(12) United States Patent
Taki et al.

(10) Patent No.: US 8,248,246 B2
(45) Date of Patent: Aug. 21, 2012

(54) RFID-TAG FABRICATING APPARATUS AND CARTRIDGE

(75) Inventors: Kazunari Taki, Nagoya (JP); Kunihiro Yasui, Nagoya (JP); Koji Sugiyama, Nagoya (JP); Mitsugi Tanaka, Nagoya (JP); Hiroshi Uchigashima, Nagoya (JP); Koji Takito, Nisshin (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1854 days.

(21) Appl. No.: 11/440,424

(22) Filed: May 25, 2006

(65) Prior Publication Data

US 2006/0267776 A1 Nov. 30, 2006

Related U.S. Application Data

(63) Continuation-in-part of application No. PCT/JP2004/017020, filed on Nov. 16, 2004.

(30) Foreign Application Priority Data

Nov. 25, 2003 (JP) ................................ 2003-394346

(51) Int. Cl.
*G08B 13/14* (2006.01)

(52) U.S. Cl. ............... 340/572.8; 340/572.1; 340/10.1; 156/277; 156/251; 156/182; 156/297; 156/300; 428/624; 428/40.1; 235/492; 235/451

(58) Field of Classification Search .... 340/572.1–572.9; 156/277, 251, 182, 297, 300, 350; 235/492, 235/451; 400/611; 428/624, 40.1
See application file for complete search history.

(56) References Cited

U.S. PATENT DOCUMENTS 5,580,417 A 12/1996 Bradshaw
(Continued)

FOREIGN PATENT DOCUMENTS

EP 1016037 B1 5/2000
(Continued)

OTHER PUBLICATIONS

International Search Report for International Patent Application No. PCT/JP2004/017020 (2 pages), Feb. 15, 2005.
(Continued)

*Primary Examiner* — Hoi Lau
(74) *Attorney, Agent, or Firm* — Baker Botts L.L.P.

(57) ABSTRACT

An RFID-tag fabricating apparatus for fabricating an RFID tag provided with an IC circuit, including a substrate-accommodating device for accommodating a first substrate in the form of a tape having a printable surface and a second substrate in the form of a tape to be bonded to the first substrate, a printing device operable to form a predetermined printed indicium on the printable surface of the first substrate, a tag-tape forming device operable to form a tag tape, by bonding together the first and second substrates such that a plurality of IC circuit portions are interposed between the first and second substrates, a tag-tape cutting device operable to cut the tag tape formed by the tag-tape forming device, and a tag-tape cutting control portion operable to change a length of a segment of the tag tape to be obtained as the RFID tag by cutting of the tag tape by the tag-tape cutting device, on the basis of a length of the printed indicium formed on the first substrate, and such that the segment includes at least one of the IC circuit portions, whereby the dimensions of the RFID tag can be changed depending upon the dimensions of the printed indicium formed on the first substrate.

33 Claims, 45 Drawing Sheets

U.S. PATENT DOCUMENTS

| | | | |
|---|---|---|---|
| 5,660,663 A | 8/1997 | Chamberlain | |
| 5,855,722 A * | 1/1999 | Osaka | 156/277 |
| 6,113,294 A | 9/2000 | Niwa | |
| 6,147,662 A | 11/2000 | Grabau | |
| 6,162,550 A * | 12/2000 | Pinchen et al. | 428/624 |
| 6,451,154 B1 * | 9/2002 | Grabau et al. | 156/300 |
| 6,627,031 B1 * | 9/2003 | Pinchen et al. | 156/251 |
| 6,736,918 B1 * | 5/2004 | Ichikawa et al. | 156/182 |
| 6,843,422 B2 * | 1/2005 | Jones et al. | 235/492 |
| 6,910,820 B2 * | 6/2005 | Baker et al. | 400/611 |
| 6,986,826 B2 * | 1/2006 | Dronzek, Jr. | 156/297 |
| 7,014,729 B2 * | 3/2006 | Grabau et al. | 156/290 |
| 7,045,186 B2 * | 5/2006 | Grabau et al. | 428/40.1 |
| 7,056,410 B2 * | 6/2006 | Kuller et al. | 156/277 |
| 7,245,227 B2 * | 7/2007 | Winter et al. | 340/686.2 |
| 7,383,864 B2 * | 6/2008 | Hogerton et al. | 156/350 |
| 7,475,819 B2 * | 1/2009 | Moriyama et al. | 235/451 |
| 7,766,570 B2 * | 8/2010 | Moriyama et al. | 400/621 |
| 2003/0016133 A1 * | 1/2003 | Egbert | 340/572.7 |
| 2003/0079830 A1 * | 5/2003 | Kuller et al. | 156/277 |
| 2003/0089444 A1 | 5/2003 | Melzer | |
| 2003/0178495 A1 * | 9/2003 | Jones et al. | 235/492 |
| 2005/0021172 A1 * | 1/2005 | Winter et al. | 700/228 |
| 2006/0081333 A1 * | 4/2006 | Hohberger et al. | 156/344 |

FOREIGN PATENT DOCUMENTS

| | | |
|---|---|---|
| JP | H08-044965 A | 2/1996 |
| JP | H11-041154 A | 2/1999 |
| JP | 2001-047586 A | 2/2001 |
| JP | 2001-063256 A | 3/2001 |
| JP | 2001513716 A | 9/2001 |
| JP | 2002-008067 A | 1/2002 |
| JP | 2002-053116 A | 2/2002 |
| JP | 2002072886 A | 3/2002 |
| JP | 2002-207984 A | 7/2002 |
| JP | 2002-373315 A | 12/2002 |
| JP | 2003-006596 A | 1/2003 |
| JP | 2003-030610 A | 1/2003 |
| JP | 2003-030615 A | 1/2003 |
| JP | 2003-523294 A | 3/2003 |
| JP | 2003-211566 A | 7/2003 |
| JP | 2003-242472 A | 8/2003 |
| WO | 9839734 | 9/1998 |
| WO | 03029005 A2 | 4/2003 |

OTHER PUBLICATIONS

Japan Patent Office; Office Action in Japanese Patent Application No. 2003-394346 (counterpart to the above-captioned U.S. patent application) mailed Nov. 10, 2009.

* cited by examiner

FIG.31

| TAG IDENTIFICATION | PING | 0x08 |
|---|---|---|
| | SCROLL ID | 0x01 |
| TAG WRITING | ERASE ID | 0x32 |
| | PROGRAM ID | 0x31 |
| | VERIFY | 0x38 |
| | LOCK | 0x31 |

# RFID-TAG FABRICATING APPARATUS AND CARTRIDGE

The present application is a continuation-in-part of International Application No. PCT/JP2004/017020 filed Nov. 16, 2004; which claims the benefits of Japanese Patent Application No. 2003-394346 filed Nov. 25, 2003.

BACKGROUND OF THE INVENTION

1. Field of the Invention

The present invention relates to an RFID-tag fabricating apparatus arranged to write information on or read information from radio or wireless tags (RFID tags) on and from which information can be read or written by radio communication, and a cartridge removably mounted on the RFID-tag fabricating apparatus.

2. Description of the Related Art

There is known an RFID (Radio Frequency Identification) system wherein a reader or interrogator is operable in a non-contact fashion to read information from small-sized RFID tags or transponders which store desired information. This RFID system permits the information stored in the RFID tags, to be read by the reader by radio communication even where the RFID tags are stained or located at invisible positions. For this reason, the use of the RFID system is expected in various fields such as commodity administration and inspection.

Generally, each RFID tag is provided with a printed indicium or representation such as a combination of characters or a bar code, which visually indicates the kind of the tag. The conventional RFID tags are dimensioned without a special consideration of formation of the printed indicium, so that there is a limitation in the size of the area in which the combination of characters, bar code or any other printed indicium is formed. Where a relatively large number of characters are printed on the RFID tag, the maximum size of each character is limited, with a result of undesirable difficulty of visual inspection of the printed characters. During an extensive and continual research by the present inventors in an effort to solve this problem, the inventors paid attention to techniques to form RFID tag circuits on a printed label having a desired printed indicium. Patent Document 1 discloses an example of such techniques applied to fabricate identification labels.

Patent Document 1: JP-2001-513716 A (WO98/39734)

However, the conventional techniques indicated above do not take into account a relationship between the dimensions of the RFID tags and those of the printed indicia formed on the printed labels. Therefore, the conventional techniques do not solve the problem. Thus, there is not available any technique by which the dimensions of the RFID tags can be changed depending upon the dimensions of the printed indicium to be formed on each RFID tag.

SUMMARY OF THE INVENTION

The present invention was made in view of the background art described above. It is accordingly a first object of this invention to provide an RFID-tag fabricating apparatus which permits a change of the dimensions of the RFID tags depending upon the desired dimensions of the printed indicia to be formed on the RFID tags. It is a second object of the invention to provide a cartridge removably mounted on the RFID-tag fabricating apparatus.

The first object indicated above may be achieved according to a first aspect of this invention, which provides an RFID-tag fabricating apparatus for fabricating an RFID tag provided with an IC circuit portion operable to store desired information, the RFID-tag fabricating apparatus comprising: a substrate-accommodating device for accommodating a first substrate in the form of a tape having a printable surface, and a second substrate in the form of a tape to be bonded to the first substrate; a printing device operable to form a predetermined printed indicium on the printable surface of the first substrate; a tag-tape forming device operable to form a tag tape, by bonding together the first and second substrates such that at least one IC circuit portion is interposed between the first and second substrates; a tag-tape cutting device operable to cut the tag tape formed by the tag-tape forming device; and a tag-tape cutting control portion operable to change a length of a segment of the tag tape to be obtained as the RFID tag by cutting of the tag tape by the tag-tape cutting device, on the basis of a length of the printed indicium formed on the first substrate, and such that the segment includes at least one of the at least one IC circuit portion.

The second object indicated above may be achieved according to a second aspect of this invention, which provides a cartridge removably mounted on the RFID-tag fabricating apparatus according to the first aspect of this invention, as the substrate-accommodating device, the cartridge accommodating the above-indicated first substrate in the form of the tape having the printable surface, and the above-indicated second substrate in the form of the tape to be bonded to the first substrate.

As described above, the RFID-tag fabricating apparatus according to the first aspect of the present invention comprises the substrate-accommodating device for accommodating the first substrate in the form of a tape having a printable surface and the second substrate in the form of a tape to be bonded to the first substrate, the printing device operable to form a predetermined printed indicium on the printable surface of the first substrate, the tag-tape forming device operable to form a tag tape, by bonding together the first and second substrates such that a plurality of IC circuit portions are interposed between the first and second substrates, the tag-tape cutting device operable to cut the tag tape formed by the tag-tape forming device, and the tag-tape cutting control portion operable to change the length of the segment of the tag tape to be obtained as the RFID tag by cutting of the tag tape by the tag-tape cutting device, on the basis of the length of the printed indicium formed on the first substrate, and such that the segment includes at least one of the plurality of IC circuit portions. Thus, the RFID-tag fabricating apparatus is capable of changing the dimensions of the RFID tag, depending upon the dimensions of the printed indicium formed on the first substrate, namely, the dimensions of the printed indicium provided on the obtained RFID tag.

In a first preferred form of the first aspect of this invention, the RFID-tag fabricating apparatus further comprises a circuit-formation judging portion operable to determine whether at least one IC circuit portion is interposed between the first and second substrates, and a tag-tape-formation control portion operable to control the tag-tape forming device such that any IC circuit portion is not interposed between the first and second substrates, when the circuit-formation judging portion does not determine that at least one IC circuit portion is interposed between the first and second substrates. In this form of the invention, the RFID-tag fabricating apparatus is capable of selectively fabricating either the RFID tag including at least one IC circuit portion, or a label including none of the IC circuit portions.

The cartridge according to the second aspect of the present invention removably mounted as the substrate-accommodating apparatus on the RFID-tag fabricating apparatus according to the first aspect of the invention accommodates the first substrate in the form of the tape having the printable surface, and the second substrate in the form of the tape to be bonded to the first substrate. The RFID-tag fabricating apparatus comprising this cartridge is capable of changing the length of the fabricated RFID tag depending upon the length of the printed indicium provided on the RFID tag.

In a preferred form of the first and second aspects of this invention, the second substrate is bonded at one of its opposite surfaces to the first substrate, and includes an adhesive layer and a releasing layer formed on the other of its opposite surfaces. In this case, the fabricated RFID tag can be easily affixed to a desired article such as an article of commodity, by the adhesive layer which is exposed by removing the releasing layer.

In another preferred form of the invention, the substrate-accommodating device accommodates also a circuit substrate in the form of at least one planar member carrying a multiplicity of the IC circuit portions, and the tag-tape forming device is arranged to interpose the circuit substrate between the first and second substrates such that at least one of the IC circuit portions is included in each of segments of the circuit substrate which are separated from each other. Accordingly, each RFID-tag fabricated has one IC circuit portion or a plurality of IC circuit portions, between the first and second substrates.

In an advantageous arrangement of the preferred form of the invention described just above, the circuit substrate has half cuts arranged at a predetermined spacing pitch in its longitudinal direction, so that the circuit substrate can be easily divided into segments by cutting at the predetermined spacing pitch.

In another advantageous arrangement of the above-described preferred form of the invention, the circuit substrate has lines of perforations arranged at a predetermined spacing pitch in its longitudinal direction, so that the circuit substrate can be easily divided into segments by cutting at the predetermined spacing pitch.

In a further advantageous arrangement of the above-described preferred form of the invention, the circuit substrate takes the form of a roll of a single tape carrying the multiplicity of IC circuit portions successively arranged at a predetermined pitch in its longitudinal direction, so that the tape of the circuit substrate can be easily fed from the roll.

In an alternative arrangement of the above-described preferred form of the invention, the circuit substrate takes the form of a pile of the pile of multiple zigzag folds of a single tape carrying the multiplicity of IC circuit portions successively arranged at a predetermined pitch in its longitudinal direction, the tape of the circuit substrate can be easily fed from the pile, and is not subject to a bending stress and is not broken or otherwise damaged.

In a further advantageous arrangement of the above-described preferred form of the invention, the circuit substrate takes the form of a pile of planar elements which are superposed on each other and each of which includes at least one of the IC circuit portions. The IC circuit portions in the pile of the planar elements are not subject to a bending stress, and are not broken or otherwise damaged.

In a still further advantageous arrangement of the above-described preferred form of the invention, the surface of the second substrate to be bonded to the first substrate and the surface of the circuit substrate opposed to the first substrate have the same color. In this case, the fabricated RFID tag has a comfortable color appearance, and the printed indicium formed on the first substrate is easily visible.

In an alternative arrangement of the above-described preferred form of the invention, the surface of the second substrate to be bonded to the first substrate and the surface of the circuit substrate opposed to the first substrate have respective different colors. In this case, the printed indicium formed in an area of the first substrate aligned with the segment of the circuit substrate is easily perceptible, with the color of the second substrate serving as a frame in which the printed indicium is located.

In a yet further advantageous arrangement of the above-described preferred form of the invention, the first substrate, second substrate and circuit substrate have the same width dimension. In this case, the RFID tags can be easily fabricated.

In an alternative arrangement of the above-described preferred form of the invention, the circuit substrate has a width dimension smaller than that of the first and second substrates. In this case, the surface area of bonding between the first and second substrates is larger than that where the three substrates have the same width dimension.

In another advantageous arrangement of the above-described preferred form of the invention, each of the IC circuit portions provided on the circuit substrate is provided with an antenna portion capable of information transmission and reception in a non-contact fashion, the circuit substrate can be cut into individual segments which are subsequently interposed between the first and second substrates, at a predetermined spacing pitch in the longitudinal direction of the first and second substrates, to form the tag tape by bonding together the first and second substrates. The individual RFID tags each having a desired length can be obtained by cutting the tag tape into segments each of which includes at least one IC circuit portion.

In a further advantageous arrangement of the above-described preferred form of the invention, the IC circuit portions of the circuit substrate are provided with respective connecting electrodes to be electrically connected to respective antenna portions which are capable of effecting information transmission and reception and which are formed on the first substrate or second substrate at a predetermined spacing pitch in its longitudinal direction. In this arrangement, cut segments of the circuit substrate are inserted between the first and second substrates bonded together, at a predetermined spacing pitch, to form the tag tape. The RFID tag can be given a desired length by removing a selected length portion of the tag tape in which the IC circuit portion is not formed, or without removing any length portion of the tag tape.

In a further preferred form of this invention, the substrate-accommodating device further accommodates a circuit substrate carrying a multiplicity of mutually separate RFID tag circuits each including the IC circuit portion and an antenna portion which is electrically connected to the IC circuit portion and which is capable of effecting information transmission and reception. In this form of the invention, the IC circuit portions are successively formed between the first and second substrates.

In a still further preferred form of the invention, the substrate-accommodating device further accommodates an intermediate substrate to be inserted between the first substrate and the circuit substrate. In this form of the invention, the IC circuit portions are suitably protected, and a printed indicium formed on the first substrate is easily visible, by selecting the color of the intermediate substrate depending upon the color of the printed indicium.

BRIEF DESCRIPTION OF THE DRAWING

The above and other objects, features and industrial significance of this invention will be better understood by reading the following detailed description of the preferred embodiments of the invention, when considered in connection with the accompanying drawings in which:

FIG. 31 is a view indicating kinds of commands determined by a command determining routine of FIG. 30;

DETAILED DESCRIPTION OF THE PREFERRED EMBODIMENTS

The preferred embodiments of the present invention will be described in detail by reference to the drawings.

First Embodiment

Figure 1:
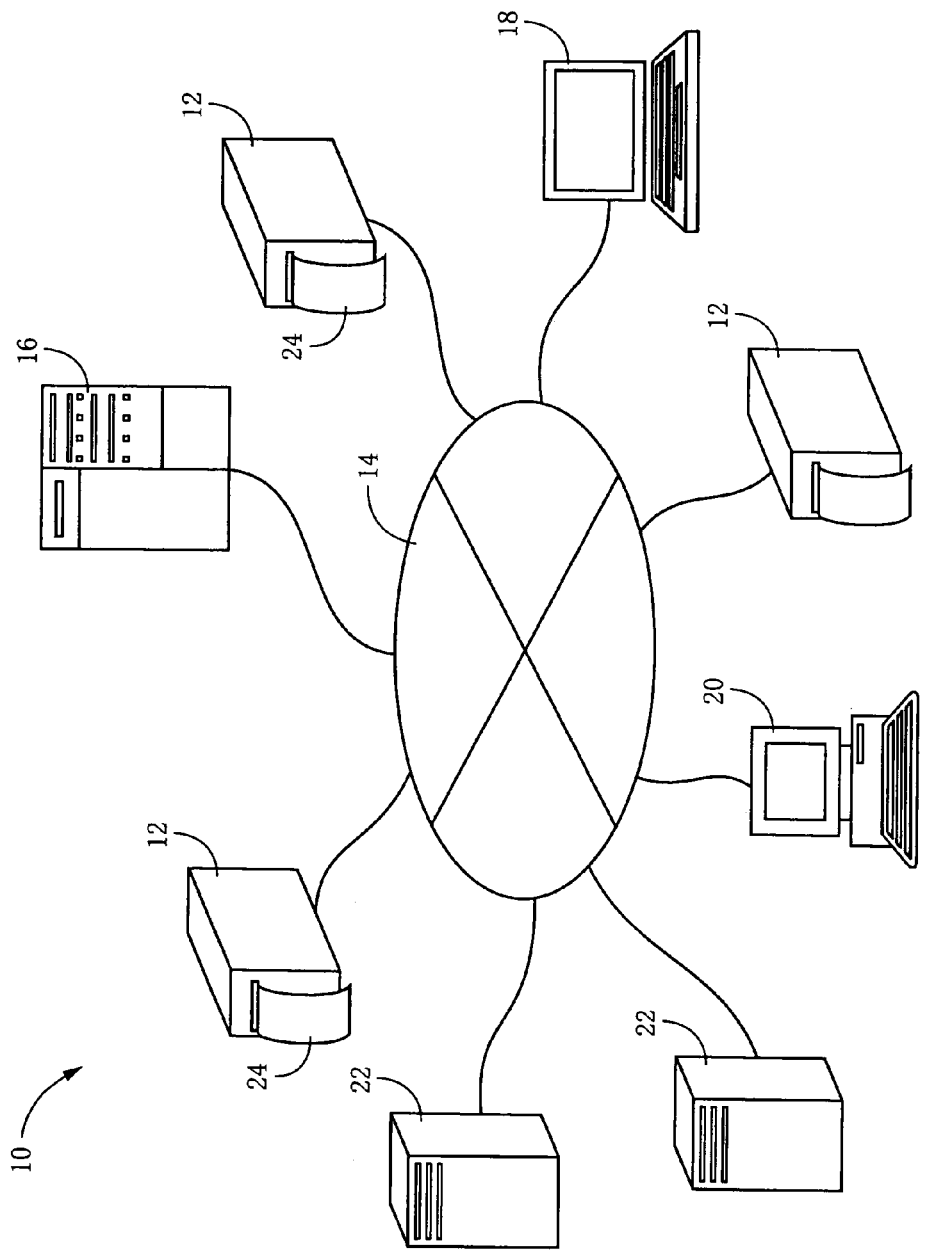
FIG. 1 is a view illustrating an RFID system to which the present invention is suitably applicable.

Referring to FIG. 1, there is illustrated an RFID system 10 to which the present is suitably applicable. In this RFID system 10, a plurality of RFID-tag fabricating apparatuses 12 each constructed according to the present invention are connected to a route server 16, a terminal 18, a general-purpose computer 20, and a plurality of information servers 22, through a wire (cable) or wireless communication line 14.

Figure 2:
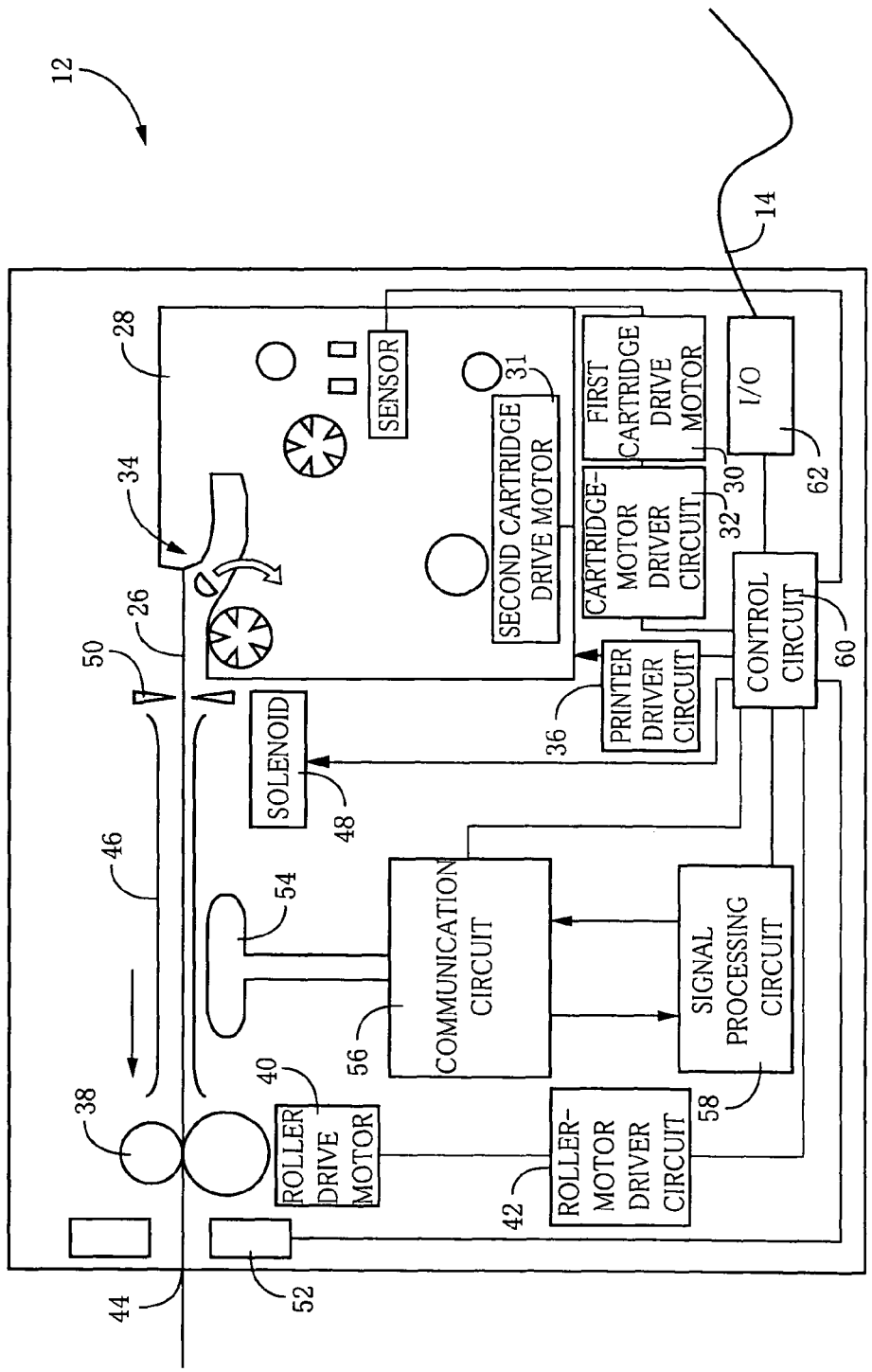
FIG. 2 is a view showing an arrangement of an RFID-tag fabricating apparatus constructed according to a first embodiment of the present invention.

Referring to FIG. 2, there is shown an arrangement of the above-described RFID-tag fabricating apparatus 12 constructed according to a first embodiment of this invention. This RFID-tag fabricating apparatus 12 is arranged to produce RFID tags 24 shown in FIGS. 4 and 15-23, in an instant, so as to meet a need of the user. For example, each RFID tag 24 is provided with desired writing ID, commodity information and other information stored in an IC circuit portion 66, as described below. As shown in FIG. 2, the RFID-tag fabricating apparatus 12 includes a removably installed cartridge 28 also constructed according to the principle of this invention. The cartridge 28 accommodates a first substrate 80 in the form of a tape, a second substrate 82 in the form of a tape, and a circuit substrate 84 in the form of a tape. Thus, the cartridge 28 serves as a substrate-accommodating device for accommodating the first and second substrates 80, 82 and the circuit substrate 84. The first substrate 80 has a surface on which a printing operation can be performed, and the first and second substrates 80, 82 can be bonded together. The circuit substrate 84 carries a multiplicity of RFID tag circuits 24A each including an antenna portion 74 and the above-indicated IC circuit portion 77. These RFID tag circuits 24A are successively arranged at a predetermined pitch in the longitudinal direction of the circuit substrate 84. The RFID-tag fabricating apparatus 12 further includes: a cartridge-motor driver circuit 32 for driving a first cartridge drive motor 30 and a second cartridge drive motor 31, to feed the first and second substrates 80, 82 and the circuit substrate 84 such that these three substrates 80, 82, 84 are bonded together, with the circuit substrate 84 sandwiched between the first and second substrates 80, 82, for thereby forming a tag tape 26; a printer driver circuit 36 for driving a printing device in the form of a thermal head 34 to perform a printing operation on the above-indicated printable surface of the first substrate 80; feed rollers 38 driven to feed the tag tape 26 in a direction indicated by arrow-headed line; a roller-motor driver circuit 42 for driving a roller drive motor 40 to rotate the feed rollers 38; a feeding guide 46 for guiding the tag tape 26 to an outlet 44; a cutting device in the form of a cutter 50 operated by a solenoid 48 to cut the tag tape 26 into the individual RFID tags 24 each having a predetermined length; a sensor 52 to detect the presence or absence of the tag tape 26 at the outlet 44; a transmission/reception antenna 54 for communication with the RFID tag circuits 24A of the RFID tags 24; a communication circuit 56 for writing information on the RFID tag circuits 24a of the RFID tags 24 through the transmission/reception antenna 54; a signal processing circuit 58 for processing reply signals from the RFID tag circuits 24A and reading information from the RFID tag circuits 24A; and a control circuit 60 for controlling the above-described cartridge-motor driver circuit 32, printer driver circuit 36, roller-motor driver circuit 42, solenoid 48, communication circuit 56, signal processing circuit 58, etc., to control the operation of the RFID-tag fabricating apparatus 12. The control circuit 60 is connected to the above-described communication line 14 through an input/output interface 62.

Figure 3:
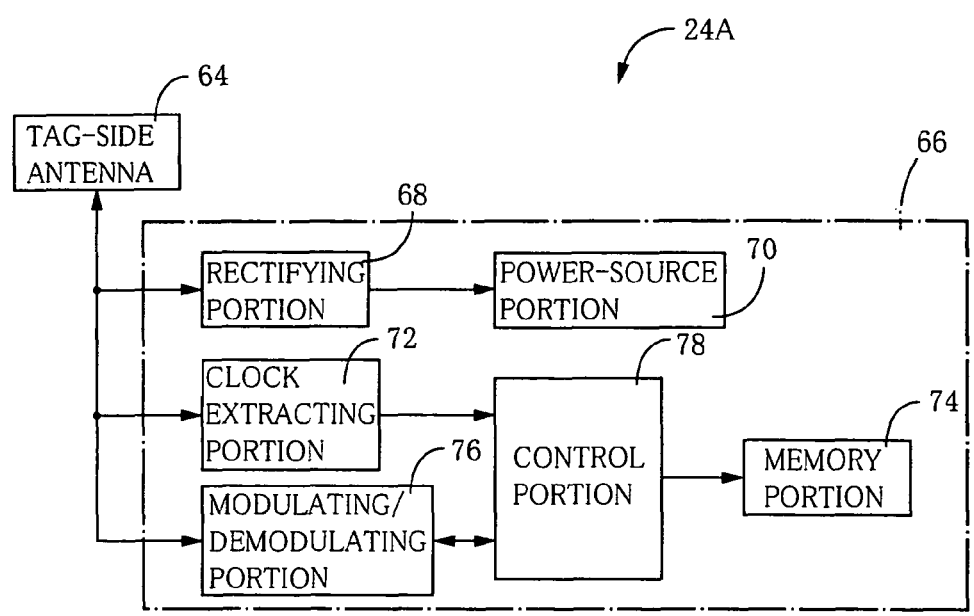
FIG. 3 is a plan view illustrating an arrangement of an RFID tag circuit on which information is to be written by the RFID-tag fabricating apparatus of FIG. 2.

Referring to FIG. 3, there is illustrated an arrangement of the above-described RFID tag circuit 24A. As shown in FIG. 3, the RFID tag circuit 24A includes: the antenna portion 64 for signal transmission and reception to and from the transmission/reception antenna 54 of the RFID-tag fabricating apparatus 12, or an interrogator different from the RFID-tag fabricating apparatus 12, and the IC circuit portion 66 connected to the antenna portion 74. The IC circuit portion 66 includes: a rectifying portion 68 to rectify a carrier wave received through the antenna portion 64; a power-source portion 70 for storing an energy of the carrier wave rectified by the rectifying portion 68; a clock extracting portion 72 for extracting a clock signal from the carrier wave received through the antenna portion 64 and applying the clock signal to a control portion 78; a memory portion 74 functioning as an information storing portion capable of storing desired information signals; a modulating/demodulating portion 76 connected to the above-described antenna portion 64; and the above-indicated control portion 78 for controlling the above-described RFID-tag circuit 24A through the above-described rectifying portion 68, clock extracting portion 72, modulating/demodulating portion 76, etc. The control portion 78 performs basic control operations such as a control operation to store the desired information in the memory portion 74 by communication with the RFID-tag fabricating apparatus 12, and a control operation to control the modulating/demodulating portion 76, for modulating the carrier wave received through the antenna portion 66 on the basis of the information signals stored in the memory portion 74, and transmitting a reply signal in the form of a reflected wave through the antenna portion 64.

Figure 4:
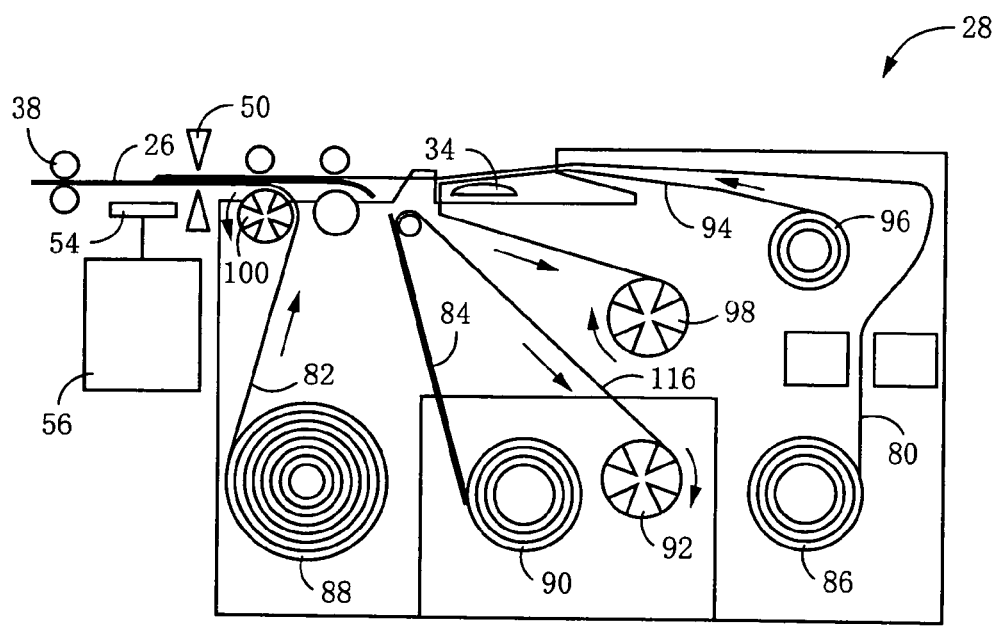
FIG. 4 is a view showing in detail an arrangement of a cartridge provided on the RFID-tag fabricating apparatus of FIG. 2.

Referring to FIG. 4, there is shown in detail an arrangement of the cartridge 28. This cartridge 28 includes: a first roll 86 which is a roll of the above-described first substrate 80; a second roll 88 which is a roll of the above-described second substrate 82; a third roll 90 which is a roll of the above-described circuit substrate 84; a first take-up roller 92 for winding a releasing layer 116 from the circuit substrate 84; an ink-ribbon roll 96 which is a roll of an ink ribbon 94; a second take-up roller 98 for winding the ink ribbon 94; and a pressure roller 100 for pressing the first and second substrates 80, 82 onto each other for bonding them together, and feeding them in the direction indicated by the arrow-headed line. Those rolls 86, 88, 90, 96 and rollers 92, 98, 100 are rotatable about their axes. Although the first roll 86 and the other rolls 88, 90, 96 are indicated in FIG. 4 by eccentric circles having different diameters, for illustrative purpose, each of those rolls is actually a roll of a single tape of the first substrate 80, second substrate 82, circuit substrate 84 or ink ribbon 94. The ink-ribbon roll 96 and the second take-up roller 98 are disposed on the back side of the first substrate 80, that is, on the side of the back surface of the first substrate 80 to be bonded to the second substrate 82. The ink ribbon 94 is forced onto the thermal head 34 disposed in the main body of the RFID-tag fabricating apparatus 12, such that the ink ribbon 94 is held in contact with the back surface of the first substrate 80. Preferably, the second take-up roller 98 and the pressure roller 100 are rotated by the above-described first cartridge drive motor 30, in synchronization with each other, and the first take-up roller 92 is rotated by the second cartridge drive motor 31, independently of the second take-up roller 98 and the pressure roller 100.

Figure 5:
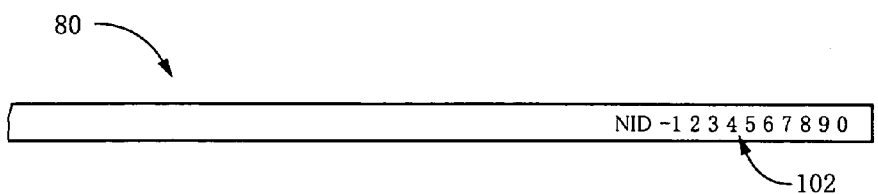
FIG. 5 is a plan view of a first substrate accommodated in the cartridge of FIG. 4.

Referring to the plan view of FIG. 5, the first substrate 80 is a transparent film formed preferably of PET (polyethylene terephthalate), for example, and is provided with a printed indicium 102 in the form of characters or a bar code indicative of the kind of the RFID tag 24. The printed indicium 102 is printed by the thermal head 34 on the back surface of the first substrate 80, that is, on the surface to be bonded to the second substrate 82.

Figure 6:
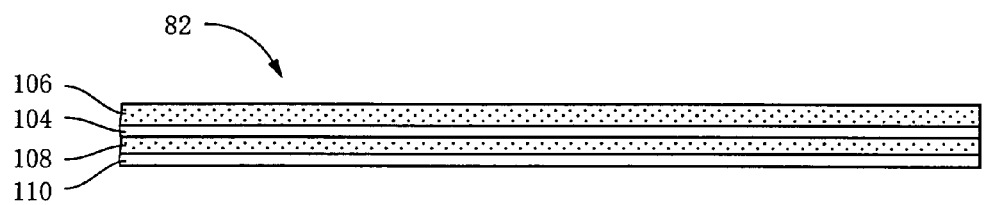
FIG. 6 is an elevational view in cross section of a second substrate accommodated in the cartridge of FIG. 4.

Referring next to the cross sectional view of FIG. 6, the second substrate 82 consists of a colored base film 104 formed of PET (polyethylene terephthalate), for example, an adhesive layer 106 formed on the front surface of the base film 104, namely, on the surface to be bonded to the first substrate 80, an adhesive layer 108 formed on the back surface of the base film 104, and a releasing layer 110 which is formed on the adhesive layer 108 such that the releasing layer 110 is removable from the adhesive layer 108. The releasing layer 110 is a glassine paper coated with a silicone resin at its opposite surfaces.

Figure 7:
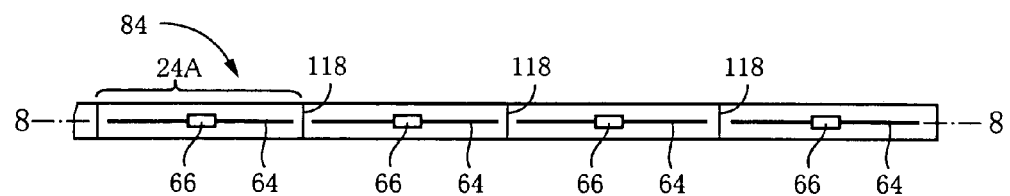
FIG. 7 is a plan view indicating an arrangement of a circuit substrate accommodated in the cartridge of FIG. 4.
Figure 8:
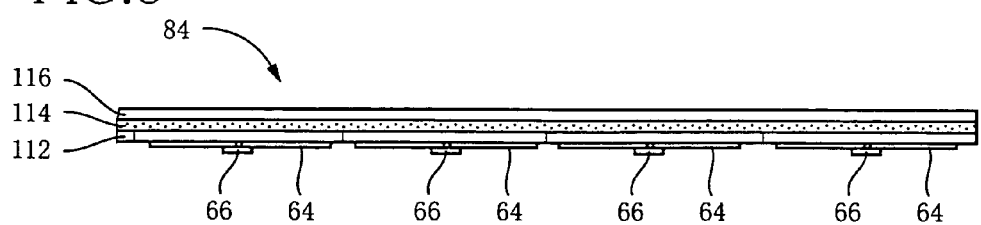
FIG. 8 is an elevational view in cross section taken along lines 8-8 of FIG. 7.
Figure 10:
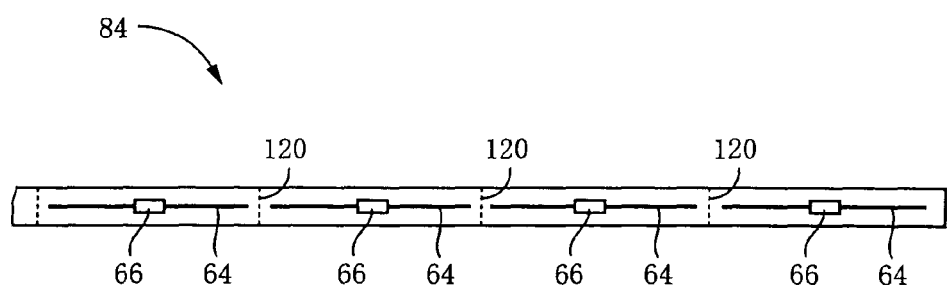
FIG. 10 is a plan view showing another arrangement of the circuit substrate accommodated in the cartridge of FIG. 4.

Referring further to the plan view of FIG. 7 and the cross sectional view of FIG. 8 taken along line 8-8 of FIG. 7, the circuit substrate 84 has a base film 112 which is formed of PET, for example, and which carries the RFID tag circuits 24A each consisting of the antenna portion 64 and the IC circuit portion 66. To one of the opposite surfaces of the base film 112, a releasing layer 116 is bonded through an adhesive layer 114 such that the releasing layer 116 is removable from the adhesive layer 114. The releasing layer 116 is a glassine paper coated with a silicone resin at its opposite surfaces. Preferably, the base film 112 has half cuts 118 formed successively in its longitudinal direction at a predetermined spacing pitch, so that the base film 112 can be easily divided into segments each having the RFID tag circuit 24A, when the base film 112 is tensioned or stretched in the longitudinal direction. The half cuts 118 may be replaced by lines of perforations 120 formed successively in its longitudinal direction at the predetermined spacing pitch, as shown in FIG. 10. Preferably, the surface of the second substrate 82 to be bonded to the first substrate 80, that is, the front surface of the base film 104, and the surface of the circuit substrate 84 opposed to the first substrate 80, namely, the front surface of the base film 112 have the same color. Preferably, the first substrate 80, second substrate 82 and circuit substrate 84 have substantially the same width dimension.

Figure 9:
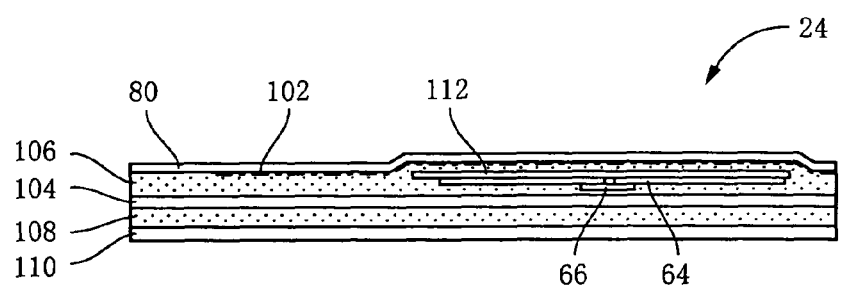
FIG. 9 is an elevational view in cross section showing an arrangement of an RFID tag to be fabricated by the RFID-tag fabricating apparatus of FIG. 2.

In the cartridge 28 shown in FIG. 4, the second take-up roller 98 and the pressure roller 100 are rotated by the first cartridge drive motor 30, in the directions indicated by the arrow-headed lines in FIG. 4, so that the first and second substrates 80, 82 are fed in the direction indicated by the arrow-headed line in FIG. 2, while the first and second substrates 80, 82 are bonded together. At the same time, the first take-up roller 92 is rotated by the second cartridge drive motor 31, in the direction indicated by the arrow-headed line in FIG. 4, so that the base film 112 carrying the RFID tag circuits 24A is inserted between the first and second substrates 80, 82 while the releasing layer 116 is removed from the base film 112. When the base film 112 is fed by a predetermined distance, the rotary motion of the first take-up roller 92 is stopped, while the rotary motions of the second take-up roller 98 and the pressure roller 100 are continued, so that the base film 112 is tensioned or stretched in its longitudinal direction, whereby the base film 112 is cut at the position of the half cut 118, so that the leading portion of the base film 112 is cut from the rest of the base film 112, whereby the RFID tag circuit 24A existing in the leading portion of the base film 112 is disposed on the tag tape 26. In the present embodiment, the first take-up roller 92, second take-up roller 98 and pressure roller 100 constitute a tag-tape forming device operable to form the tag tape 26, by bonding together the first and second substrates 80, 82 such that an RFID tag circuit 24A is interposed between the first and second substrates 80, 82. The tag tape 26 thus formed is cut by the cutter 50 into the individual RFID tags 24, each of which has the predetermined length and is provided with the antenna portion 64 and the ID circuit portion 66 that are located between the first and second substrates 80, 82 bonded together, as shown in FIG. 9. When each RFID tag 24 is attached to a desired article of commodity, the releasing layer 110 is removed from the RFID tag 24, and the RFID tag 24 is bonded at its adhesive layer 108 to the desired article.

Figure 11:
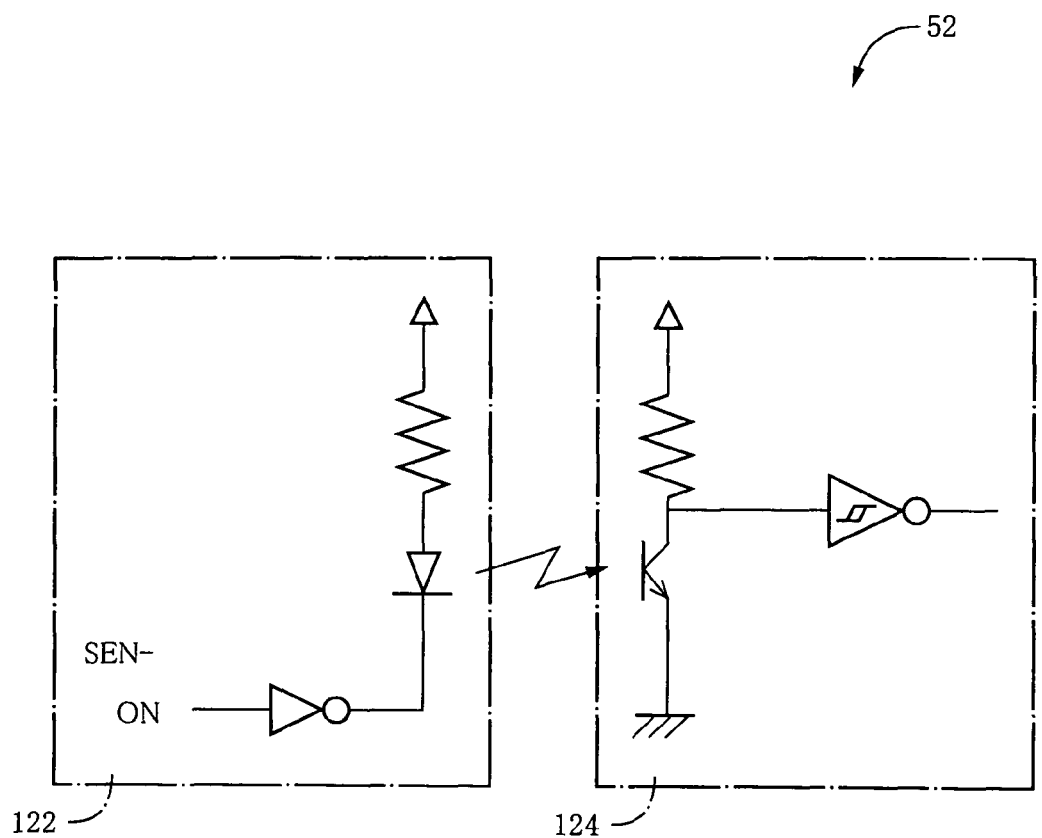
FIG. 11 is a view illustrating an electrical arrangement of a sensor disposed in the RFID-tag fabricating apparatus of FIG. 2.

Referring to FIG. 11, there is illustrated an electrical arrangement of the above-described sensor 52. As shown in FIG. 11, the sensor 52 is a light-transmission type photoelectric sensor consisting of a light emitter 122 and a light receiver 124, for example. When the tag tape 26 or RFID tag 24 is not present between the light emitter 122 and light receiver 124, a light emitted from the light emitter 122 is received by the light receiver 124. When the tag tape 26 or RFID tag 24 is present between the light emitter and receiver 122, 124, on the other hand, the light emitted from the light emitter 122 is intercepted by the tag tape 26 or RFID tag 24, so that the output of the light receiver 124 is reversed. The output of the light receiver 124 indicative of the presence or absence of the tag tape 26 or RFID tag 24 is applied to the control circuit 60.

Figure 12:
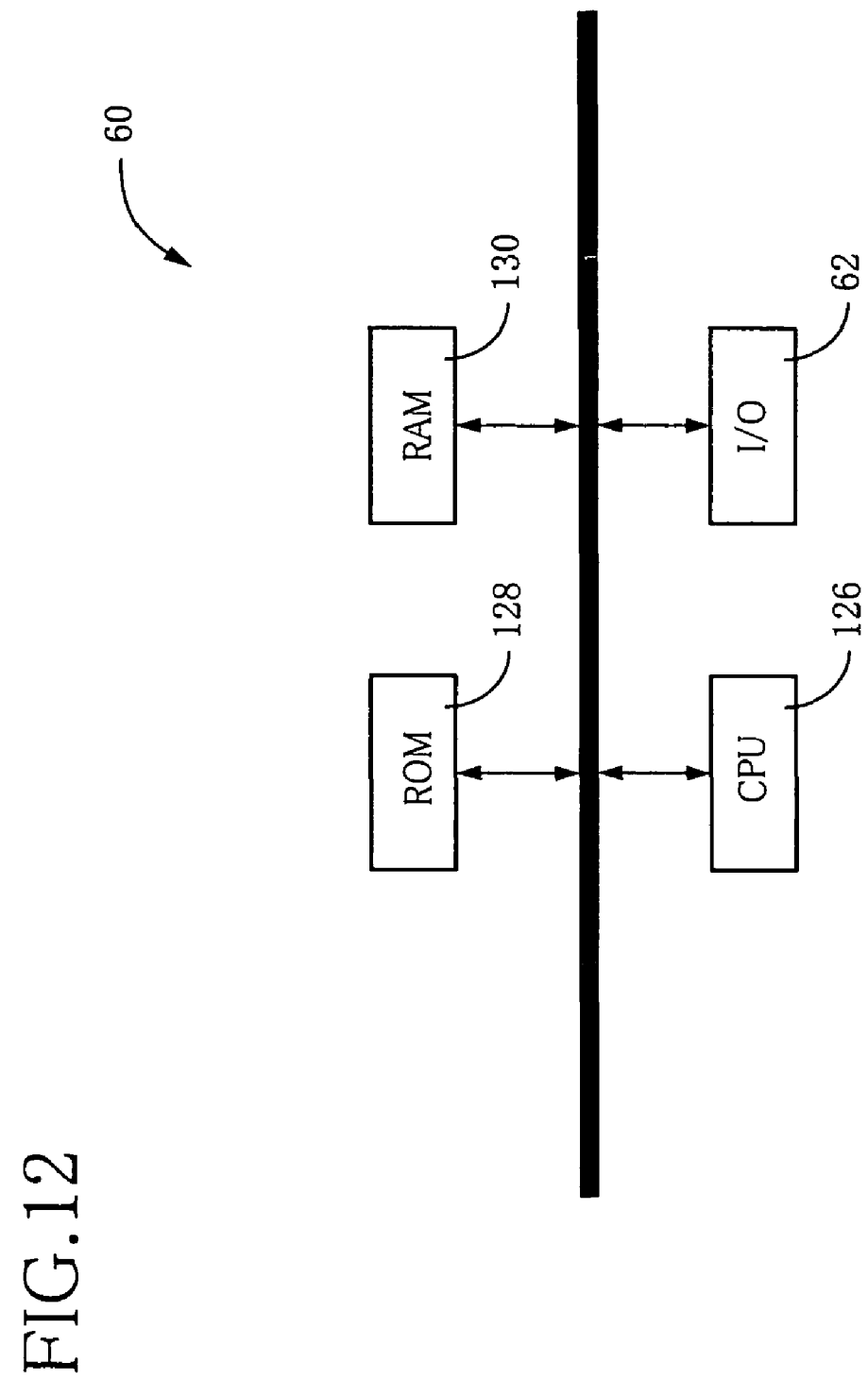
FIG. 12 is a view illustrating an arrangement of a control circuit provided in the RFID-tag fabricating apparatus of FIG. 2.

Referring to FIG. 12, there is illustrated an arrangement of the control circuit 60. As shown in FIG. 12, the control circuit 60 is a so-called microcomputer which incorporates a CPU 126 functioning as a central processing unit, a ROM (read-only memory) 128, and a RAM (random-access memory) 130 and which operates to perform signal processing operations according to programs stored in the ROM 128, while utilizing a temporary data storage function of the RAM 130. The control circuit 60 is connected to the above-described communication line 14 through the input/output interface 62, for transmission and reception of information to and from the above-described route server 16, terminal 18, general-purpose computer 20 and information servers 22.

Figure 13:
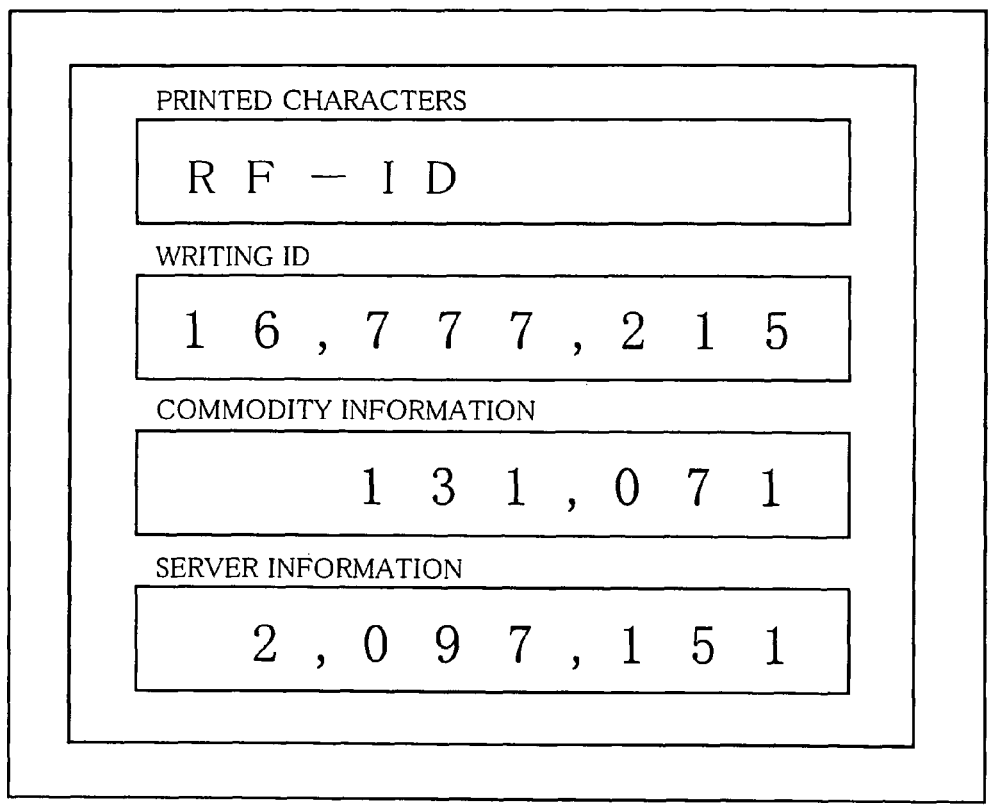
FIG. 13 is a view showing an example of a display view provided on a terminal or general-purpose computer shown in FIG. 1, when information is written on the RFID tag of FIG. 3 by the RFID-tag fabricating apparatus of FIG. 2.

FIG. 13 shows an example of a display view provided on the above-described terminal 18 or general-purpose computer 20 when information is written on the RFID tag 24 by the RFID-tag fabricating apparatus 12. As shown in FIG. 13, the terminal 18 or general-purpose computer 20 is capable of displaying the printed indicium 102 such as printed characters or a bar code to be printed on the RFID tag 24, writing ID specific to that RFID tag 24, and addresses of the information servers 22 at which the commodity information is stored, and addresses of the route server 16 at which server information is stored. By manipulating the terminal 18 or general-purpose computer 20, the RFID-tag fabricating apparatus 12 is operated to print the printed indicium 102 on the tag tape 26, and store the writing ID, commodity information, etc. on the IC circuit portion 66. The route serve 16 stores data indicative of a relationship between the ID of each RFID-tag 24 and the information written on the RFID tag 24. Reference to this relationship can be made as needed.

Figure 14:
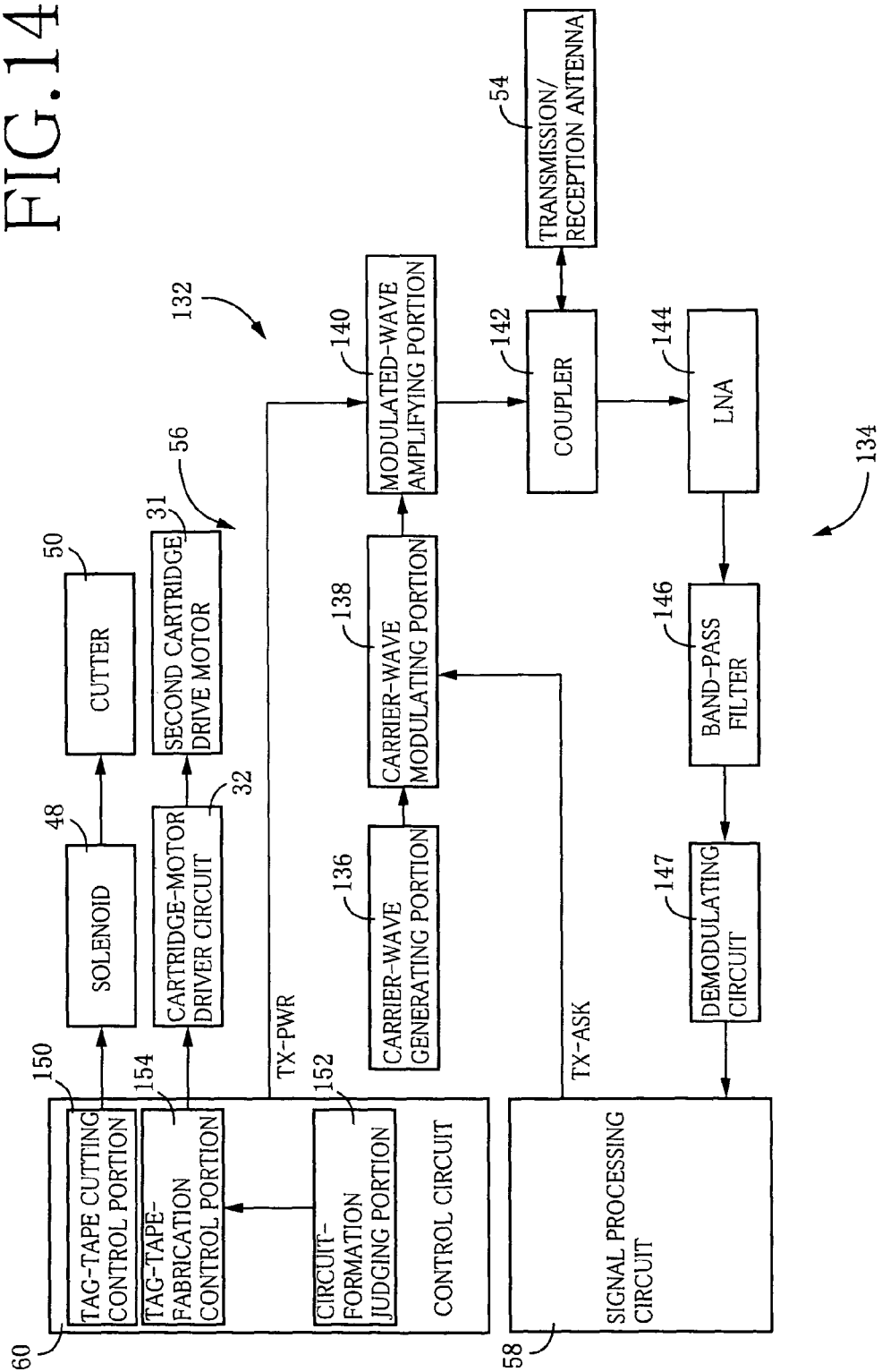
FIG. 14 is a view showing in detail an arrangement of a communication circuit provided in the RFID-tag fabricating apparatus of FIG. 2.

Referring to FIG. 14, there are shown in detail an arrangement of the communication circuit 56 and an arrangement of the control circuit 60. As shown in FIG. 14, the communication circuit 56 includes a transmitting portion 132 operable to transmit a suitable signal to the RFID tag circuit 24A, and a receiving portion 134 operable to receive a reflected wave from the RFID tag 24. The transmitting portion 132 includes: a carrier-wave generating portion 136 operable to generate a carrier wave for writing information on the RFID tag 24 according to a command signal from the control circuit 60; a carrier-wave modulating portion 138 operable to modulate the carrier wave generated by the carrier-wave generating portion 136, on the basis of an information signal received from the signal processing portion 58 (for example, operable to effect amplitude modulation of the generated carrier wave on the basis of TX-ASK signal); and a modulated-wave amplifying portion 140 operable to amplify the carrier wave modulated by the carrier-wave modulating portion 138. An output of the modulated-wave amplifying portion 140 is transmitted to the above-described transmission/reception antenna 54 through a coupler 142, and transmitted from the antenna 54 to the IC circuit portion 66 through the antenna portion 64 of the RFID tag circuit 24A.

The reflected wave received from the RFID tag circuit 24A through the transmission/reception antenna 54 is received by the receiving portion 134 through the coupler 142. This receiving portion 134 includes: a LNA (low noise amp.) 144 operable to amplify the signal received from the transmission/reception antenna 54; a band-pass filter 146 which passes only a frequency component of the signal amplified by the LNA 144, which frequency component has a frequency within a predetermined frequency band; and a demodulating circuit 147 of homodyne detection type operable to demodulate the frequency component received from the band-pass filter 146. An output of the demodulating circuit 147 is applied to the signal processing circuit 58, and decoded by the signal processing circuit 58, so that the information relating to the modulation by the RFID tag circuit 24A, that is, the information stored in the memory portion 74 is read out.

Figure 15:
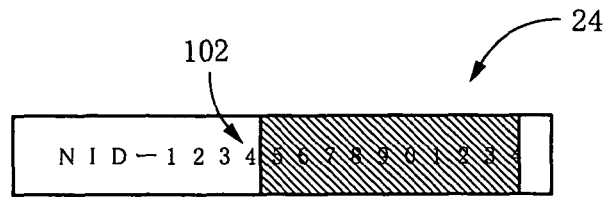
FIG. 15 is a view illustrating an example of an RFID tag to be fabricated by the RFID-tag fabricating apparatus of FIG. 2, which RFID tag has a comparatively large longitudinal dimension.
Figure 16:
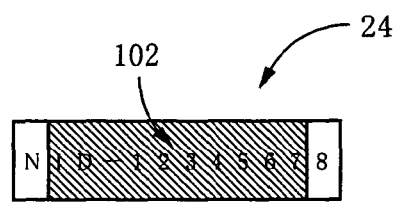
FIG. 16 is a view illustrating an example of an RFID tag to be fabricated by the RFID-tag fabricating apparatus of FIG. 2, which RFID tag has a comparatively small longitudinal dimension.

A tag-tape cutting control portion 150, a circuit-formation judging portion 142 and a tag-tape-fabrication control portion 154 shown in FIG. 14, are functional portions of the above-described control circuit 60. The tag-tape cutting control portion 150 is operable to determine or change the length of a segment of the tag tape 26 to be obtained as the RFID tag 24 by cutting of the tag tape 26 by the cutter 50. The tag-tape cutting control portion 150 determines the length of the segment on the basis of the printed indicium provided on the first substrate 80, such that the segment includes at least one RFID tag circuit 24A. For example, the tag-tape cutting control portion 150 controls the solenoid 48 for controlling the cutting operation of the cutter 50, such that the length of the segment of the tag tape 26 obtained by the cutting operation corresponds to the number of the characters of the printed indicium 102 provided on the first substrate 80, or the length of a line of those characters. Where the printed indicium 102 consists of a comparatively large number of characters (the line of the characters has a comparatively large length), the length of the segment of the tag tape 26 to be obtained by the cutting operation of the cutter 50 is made comparatively large, as indicated in FIG. 15, so that the entirety of the printed indicium 102 can be accommodated within the length of the obtained segment of the tag tape 26, that is, within the length of the obtained RFID tag 24, even if the characters of the printed indicium 102 are comparatively large and easily legible. Where the printed indicium 102 consists of a comparatively small number of characters (the line of the characters has a comparatively small length), the length of the segment of the tag tape 26 to be obtained by the cutting operation of the cutter 50 is made comparatively small, as indicated in FIG. 16, so that the length of the obtained RFID tag 24 including the RFID tag circuit 24A can be reduced. In FIGS. 15-20, 22 and 23, the position of the RFID tag circuit 24A provided on the cut base film 112 is indicated by inclined hatching lines.

The circuit-formation judging portion 152 is operable to determine, on the basis of an input information received from the terminal 18, for example, whether the RFID tag circuits 24A are interposed between the first and second substrates 80, 82, that is, whether the RFID tags 24 each having the antenna portion 64 and the IC circuit portion 66, or labels not having the RFID tag circuits 24A are fabricated by the RFID-tag fabricating apparatus 12. When a negative decision is made by the circuit-formation judging portion 152, the tag-tape-fabrication control portion 154 controls the rotary motions of the first take-up roller 92, second take-up roller 98 and pressure roller 10 of the tag-tape forming device, such that any RFID tag circuit 24A is not interposed between the first and second substrates 80, 82. Described more specifically, the cartridge-motor drive circuit 32 is controlled not to operate the second cartridge drive motor 31, for inhibiting the rotation of the first take-up roller 92 to prevent feeding of the circuit substrate 84. Thus, the present RFID-tag fabricating apparatus 12 is arranged to fabricate either the RFID tags 24, or the labels not having the RFID tag circuits 24A, depending upon the signal received from the terminal 18.

Figure 17:
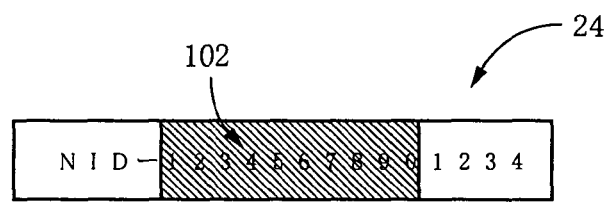
FIG. 17 is a view illustrating an example of an RFID tag to be fabricated by the RFID-tag fabricating apparatus of FIG. 2, wherein a first substrate and a second substrate are centered with a circuit substrate.
Figure 18:
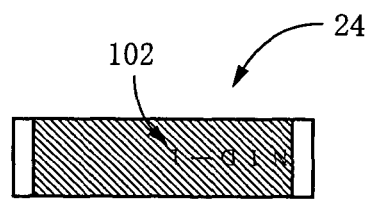
FIG. 18 is a view illustrating an example of an RFID tag to be fabricated by the RFID-tag fabricating apparatus of FIG. 2, wherein an RFID tag circuit on the circuit substrate and a printed indicium on the first substrate have the right ends at the same longitudinal position.
Figure 19:
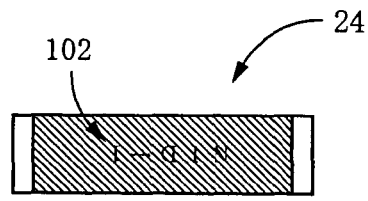
FIG. 19 is a view illustrating an example of an RFID tag to be fabricated by the RFID-tag fabricating apparatus of FIG. 2, wherein the RFID tag circuit on the circuit substrate and the printed indicium on the first substrate have the longitudinal centers at the same longitudinal position.
Figure 20:
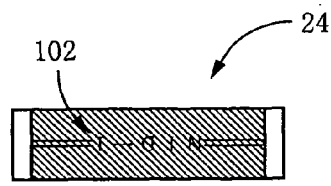
FIG. 20 is a view illustrating an example of an RFID tag to be fabricated by the RFID-tag fabricating apparatus of FIG. 2, wherein the RFID tag circuit on the circuit substrate and the printed indicium on the first substrate have the right ends at the same longitudinal position, and the left ends at the same longitudinal position.

Preferably, the tag-tape-fabrication control portion 154 controls the rotary motion of the first take-up roller 92, such that the base film 112 of the circuit substrate 84 is inserted between the first and second substrates 80, 82, at a controlled or selected timing, so that the position of the RFID tag circuit 24A relative to the first and second substrates 80, 82 (relative to the printed indicium 102 on the first substrate 80) can be selected or changed as desired, as indicated in FIGS. 15 and 17, in particular. In the example of FIG. 18, the RFID tag circuit 24A and the printed indicium 102 have the right ends at the same longitudinal position of the RFID tag 24, namely, are aligned at the right end of the RFID tag 24. The RFID tag circuit 24A and the printed indicium 102 may have the left ends at the same longitudinal position, namely, are aligned t the left end of the RFID tag 24. In the example of FIG. 19, the RFID tag circuit 24A and the printed indicium 102 have the longitudinal centers at the same longitudinal position of the RFID tag 24, namely, are aligned at the center of the RFID tag 24. In the example of FIG. 20, the RFID tag circuit 24A and the printed indicium 102 the right ends at the same longitudinal position of the RFID tag 24, and the left ends at the same longitudinal position. Thus, various types of RFID tags 24 can be fabricated under the control of the tag-tape-fabrication control portion 154.

Figure 21:
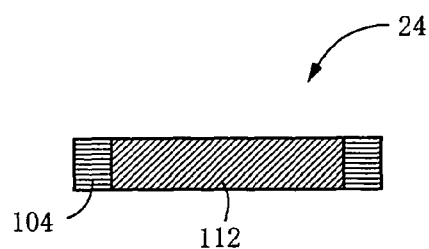
FIG. 21 is a view illustrating an example of an RFID tag wherein the surface of the second substrate of FIG. 6 bonded to the first substrate, and the surface of the circuit substrate of FIG. 7 opposed to the first substrate have different colors.

Referring to the plan view of FIG. 21 showing the RFID tag 24, horizontal hatching lines indicate the color of the base film 104, while inclined hatching lines indicate the color of the base film 112. As indicated in FIG. 21, the surface of the second substrate 82 to be bonded to the first substrate 80, namely, the front surface of the base film 104, and the surface of the circuit substrate 84 opposed to the first substrate 80, namely, the front surface of the base film 112 may have respective different colors. For instance, the base film 104 has a black color or any other color having a relatively low degree of brightness, while the base film 112 has a white color or any other color having a relatively high degree of brightness, so that the printed indicium 102 provided on the surface of the first substrate 80 opposed to the base film 112 is easily perceptible. The front surfaces of the base film 104 and the base film 112 may have similar colors having different degrees of density. According to the color arrangements indicated above, the printed indicium 102 formed so as to extend over the boundary between the base films 104, 112 is clearly visible, and the position of the RFID tag circuit 24A can be easily visually recognized, so that the RFID tag 24 can be attached to a desired article such that the RFID tag circuit 24A is isolated from a metallic material.

Figure 22:
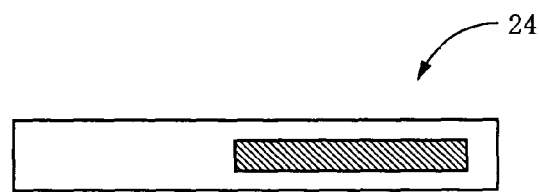
FIG. 22 is a view illustrating an example of an RFID tag wherein the circuit substrate of FIG. 7 has a smaller width dimension that the first substrate of FIG. 5.
Figure 46:
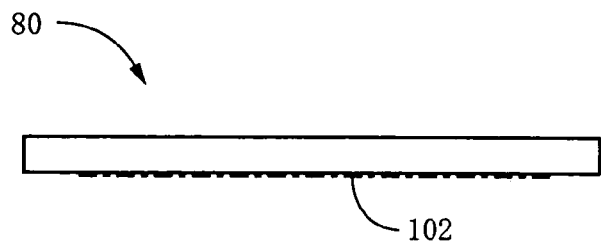
FIG. 46 is an elevational view in cross section of a first substrate accommodated in the cartridge of FIG. 45.
Figure 47:
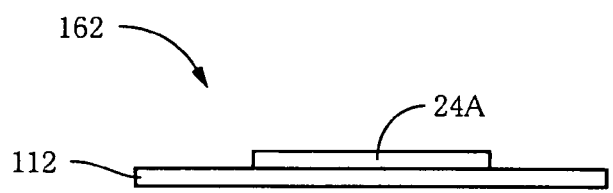
FIG. 47 is an elevational view in cross section of a circuit substrate accommodated in the cartridge of FIG. 45.

The circuit substrate 84 may have a width dimension smaller than that of the second substrate 82, as in the embodiment of FIGS. 46-48 which will be described. In this case, the RFID tags 24 as shown in FIG. 22 are fabricated. In these RFID tags 24, the surface area of bonding between the first and second substrates 80, 82 is larger than that in the RFID tags 24 of FIG. 15, etc. wherein the first and second substrates 80, 82 and the circuit substrate 84 have substantially the same width dimension. Thus, the RFID tags 24 as shown in FIG. 22 are effectively arranged to prevent removal of the RFID tag circuit 24A sandwiched between the first and second substrates 80, 82.

Figure 23:
FIG. 23 is a view illustrating an example of an RFID tag having two RFID tag circuits of FIG. 3.

A single RFID tag 24 may include two or more RFID tag circuits 24A, as shown in FIG. 23, where the rotary motions of the first take-up roller 92, second take-up roller 98 and pressure roller 100 are suitably controlled by the tag-tape-fabrication control portion 154. The RFID tag 24 including the two or more RFID tag circuits 24A can store a larger volume of information than the RFID tag 24 including only one RFID tag circuit 24A as shown in FIG. 15.

Figure 24:
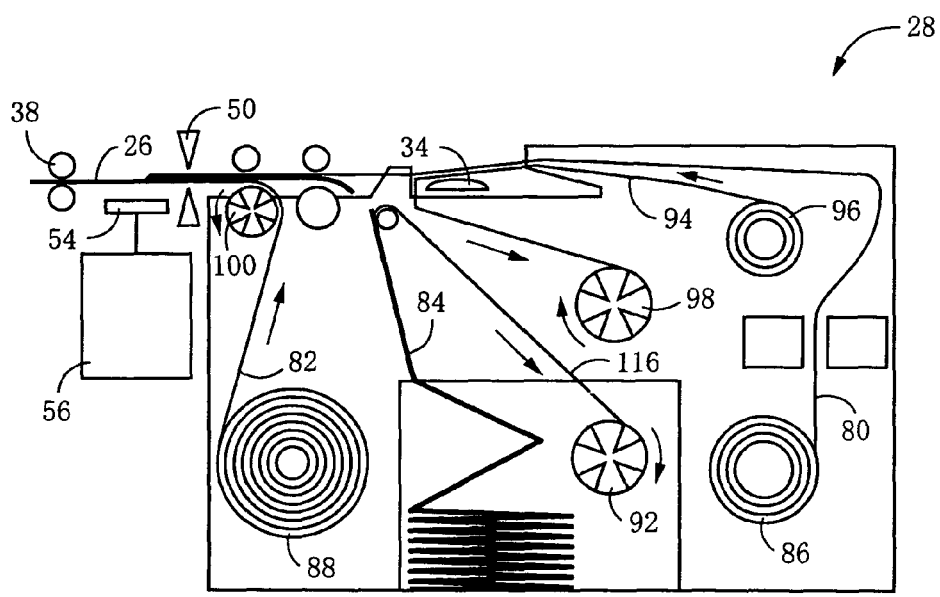
FIG. 24 is a view showing a modified form of the cartridge of FIG. 4.

The circuit substrate 84 may take the form of a pile of multiple zigzag folds accommodated in the cartridge 28, as shown in FIG. 24. Where the antenna portion 64 and the IC circuit portion 66 which constitute the RFID tag circuit 24A are formed of a comparatively hard material, these portions 64, 66 are subject to a bending stress if the circuit substrate 84 takes the form of the roll 90, and may be broken or otherwise damaged. The circuit substrate 84 in the form of a pile of multiple zigzag folds is not subject to a bending stress at the antenna portion 64 and IC circuit portion 66 of its RFID tag circuit 24A, and is not broken or otherwise damaged, where the circuit substrate 84 is folded at its longitudinal positions corresponding to the half cuts 118 shown in FIGS. 7 and 8.

Then, there will be described an operation to write information on the RFID tag circuits 24A in the RFID system 10 constructed as described above, and a preceding operation for preparation for the information writing operation.

Figure 25:
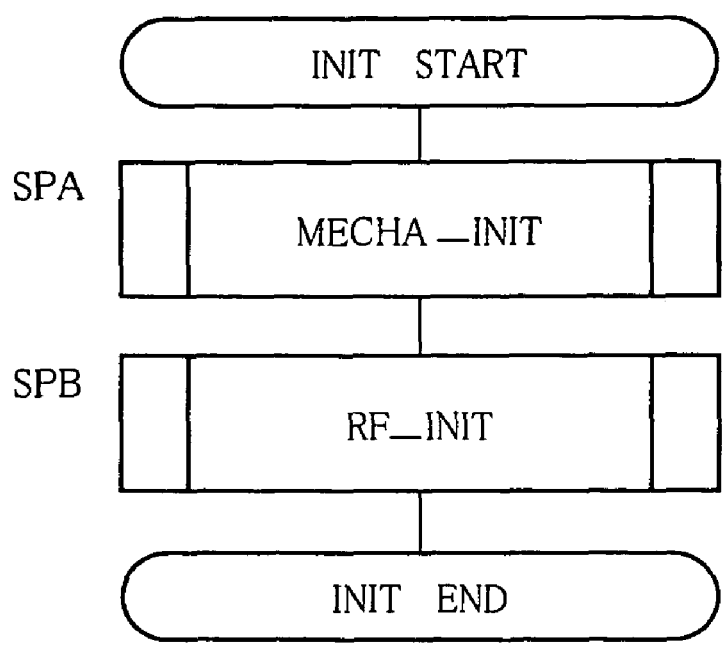
FIG. 25 is a flow chart illustrating an initializing operation of the RFID-tag fabricating apparatus of FIG. 2, which is performed before information is written on the RFID tag of FIG. 3 in the RFID system of FIG. 1.

Referring to the flow chart of FIG. 25, there will be described an initializing operation of the RFID-tag fabricating apparatus 12, which is performed prior to the operation to write information on the RFID tag circuits 24A in the RFID system 10. Initially, step SPA is implemented to initialize mechanical information of the above-described RFID-tag fabricating apparatus 12. Then, step SPB is implemented to initialize the settings of the carrier-wave generating portion 136 of the communication circuit 56 in the RFID-tag fabricating apparatus 12, and the execution of the present routine is terminated.

Figure 26:
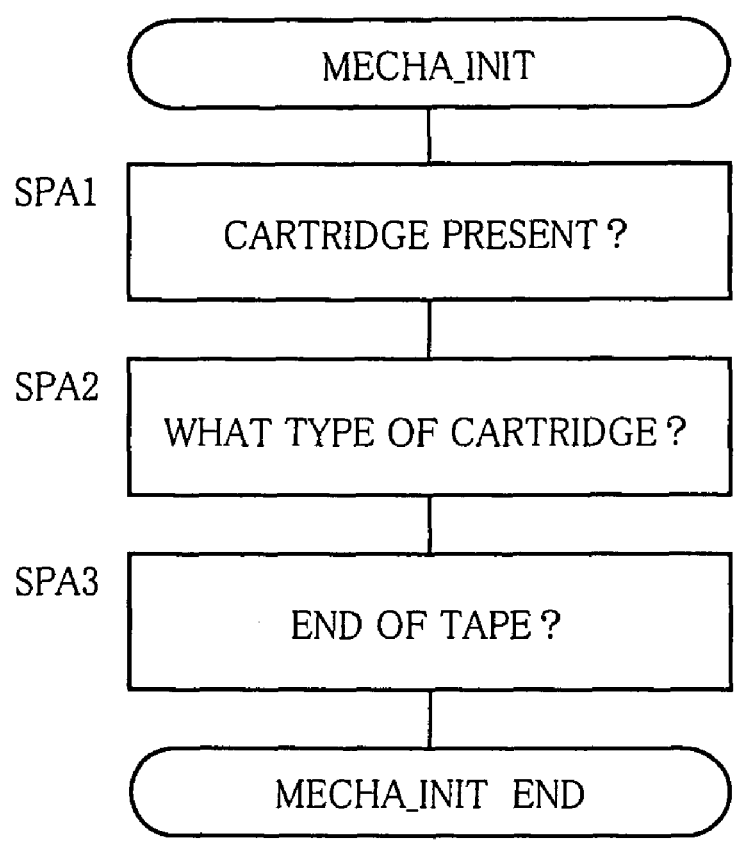
FIG. 26 is a flow chart illustrating initialization of mechanical information of the RFID-tag fabricating apparatus in step SPA of FIG. 25.

Referring to the flow chart of FIG. 26, there will be described the initializing operation of the mechanical information of the RFID-tag fabricating apparatus 12 in SPA of FIG. 25. Initially, step SPAL is implemented to determine whether the cartridge 28 is present or not. Then, step SPA2 is implemented to determine the type of the cartridge 28, that is, check the width of the tag tape 26 and determine whether the RFID is present or not. Then, step SPA3 is implemented to determine whether the tag tape 26 of the cartridge 28 has been exhausted, and the execution of the present routine is terminated.

Figure 27:
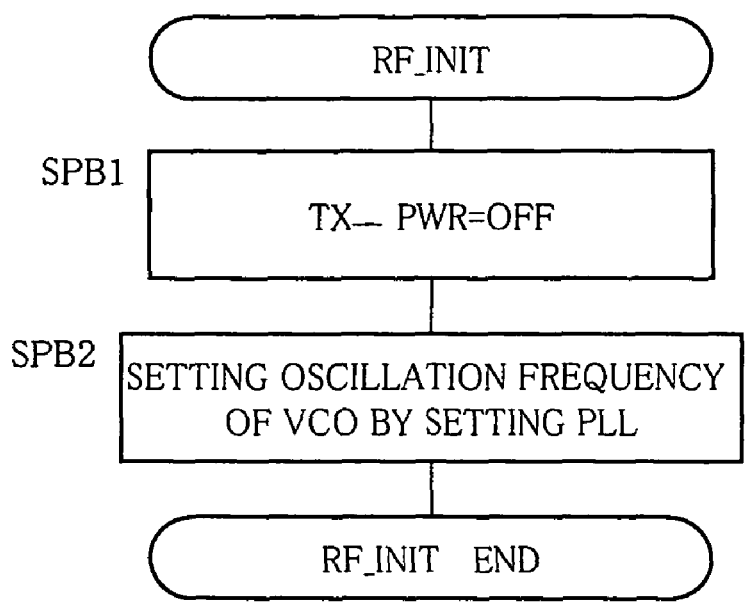
FIG. 27 is a flow chart illustrating a setting initializing operation of a carrier-wave generating portion provided in the communication circuit of the RFID-tag fabricating apparatus in step SPB of FIG. 25.

Referring to the flow chart of FIG. 27, there will be described a setting initializing operation of the carrier-wave generating portion 136 of the communication circuit 56 of the RFID tag fabricating apparatus 12 in step SPB of FIG. 25. Initially, step SPB1 is implemented to turn off a signal TX_PWR which is applied to the above-described modulated-wave amplifying portion 140 to set its signal intensity. Then, step SPB2 is implemented to set the carrier wave frequency in PLL (Phase Locked Loop) provided in the carrier-wave generating portion 136, and lock the oscillation frequency of VCO (Voltage Controller Oscillator) also provided in the carrier-wave generating portion 136, by a control voltage from the PLL.

Figure 28:
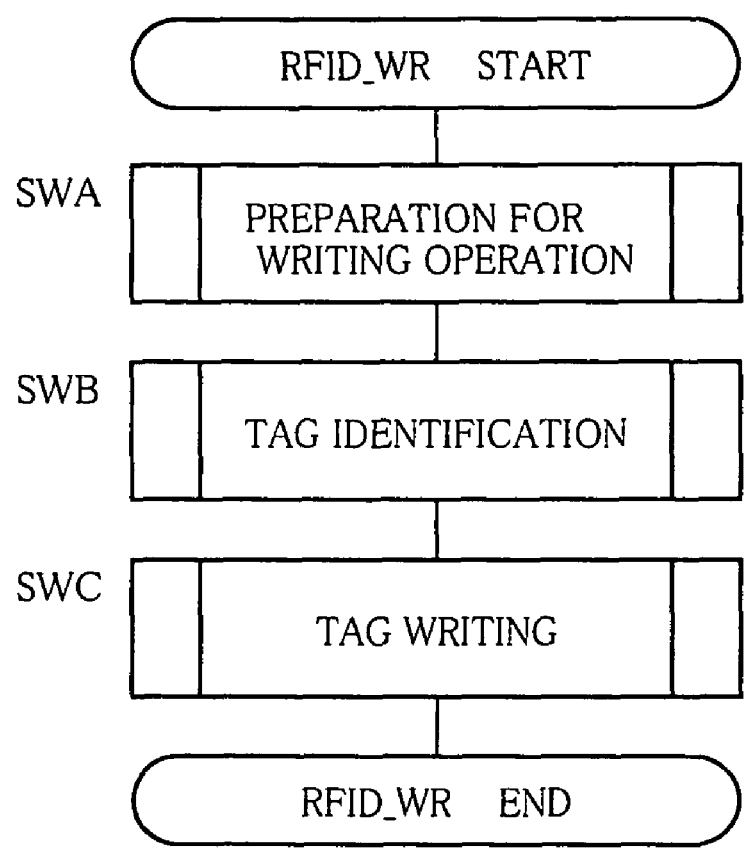
FIG. 28 is a flow chart illustrating an operation of the RFID-tag fabricating apparatus of FIG. 2 to write information on the RFID tag of FIG. 3.

Referring to the flow chart of FIG. 28, there will be described an operation of the RFID-tag fabricating apparatus 12 to write information on the RFID tag circuit 24A. Initially, step SWA is implemented to prepare for an operation to write information on the RFID tag circuit 24A. Then, step SWB is implemented to identify the selected or desired RFID tag circuit 24A on which the information is to be written. Then, step SWC is implemented to write information on the RFID tag circuit 24A, and the execution of the present routine is terminated.

Figure 29:
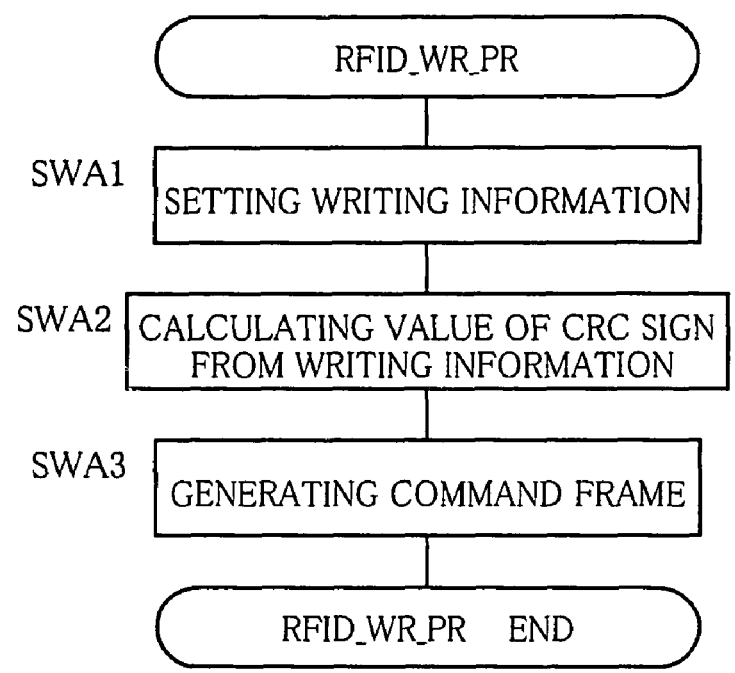
FIG. 29 is a flow chart illustrating an operation to prepare for information writing on the RFID tag in step SWA of FIG. 28.

Referring to the flow chart of FIG. 29, there will be described an operation to prepare for information writing on the RFID tag circuit 24A in step SWA of FIG. 28. Initially, step SWA1 is implemented to set the information to be written on the RFID tag circuit 24A, such as writing ID and commodity information. A relationship between the writing ID and the commodity information is registered in the above-described information servers 22 through the communication line 14, before or after the information writing on the RFID tag circuit 24A. Then, step SWA2 is implemented to calculate a value of a CRC (Cyclic Redundancy Check) sign from the information set in step SWA1. This CRC sign is a signal for detecting an error of communication with the RFID tag circuit 24A, and its value is represented by a polynominal, for example, $X^{16}+X^{12}+X^5+1$. In the operation to identify the RFID tag circuit 24A. The RFID-tag fabricating apparatus 12 calculates the value of the CRC sign from received data, and detect the communication error by comparing a received value of the CRC sign with the thus calculated CRC value. Then, step SWA3 is implemented to generate a command frame on the basis of the information set in step SWA1, and the execution of the present routine is terminated.

Referring to the flow chart of FIG. 30, there will be described an operation to generate modulating information for transmitting information to the RFID tag circuit 24A. Initially, sep SWD1 is implemented to identify the desired RFID tag circuit 24A on which the information is to be written, or to set a function of the information writing on the RFID tag circuit 24A. Then, step SWD2 is implemented to determine a command corresponding to the function set in step SWD1. Then, step SWD3 is implemented to generate a command frame on the basis of the command determined in step SWD2, the writing information set in step SWA1 of FIG. 29, and the CRC sign set in step SWA2. Then, step SWD4 is implemented to store the command frame generated in step SWD3, in a memory buffer of the above-described control circuit 60. Then in step SWD5, the modulating information in the form of a TX-ASK signal is generated by the signal processing circuit 58 on the basis of the command frame stored in the memory buffer.

Figure 30:
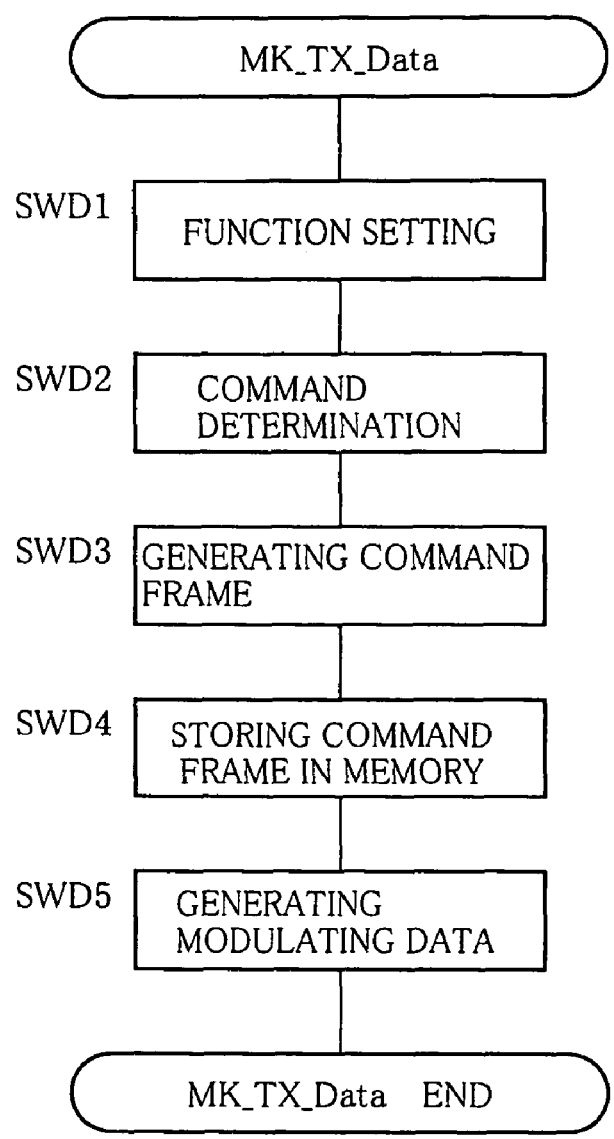
FIG. 30 is a flow chart illustrating generation of modulating information for transmitting information to the RFID tag of FIG. 3.

FIG. 31 indicates the kinds of commands determined by the command determining routine of FIG. 30. The communication to identify the desired RFID tag circuit 24A on which the information is to be written uses commands such as "PING" and "SCROLL ID" for reading out the information stored in the RFID tag circuit 24A are used. The communication to write the information on the RFID tag circuit 24A uses commands such as "ERASE ID" for initializing the information stored in the RFID tag circuit 24A, "PROGRAM ID" for information writing, "VERIFY" for verifying the information written, and "LOCK" for inhibiting writing of new information.

Figure 32:
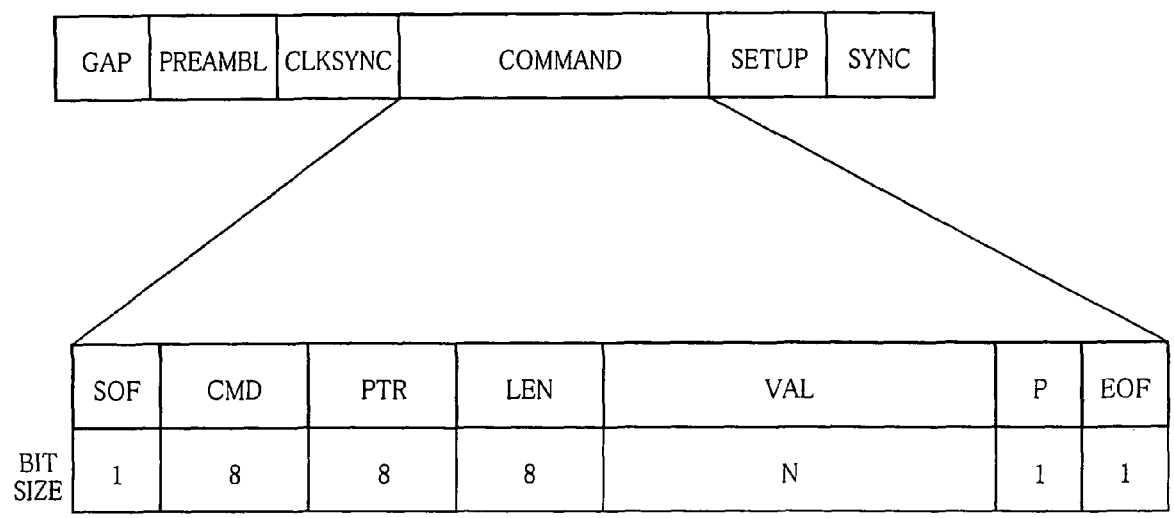
FIG. 32 is a view showing in detail a structure of a command frame of FIG. 30.
Figure 33:
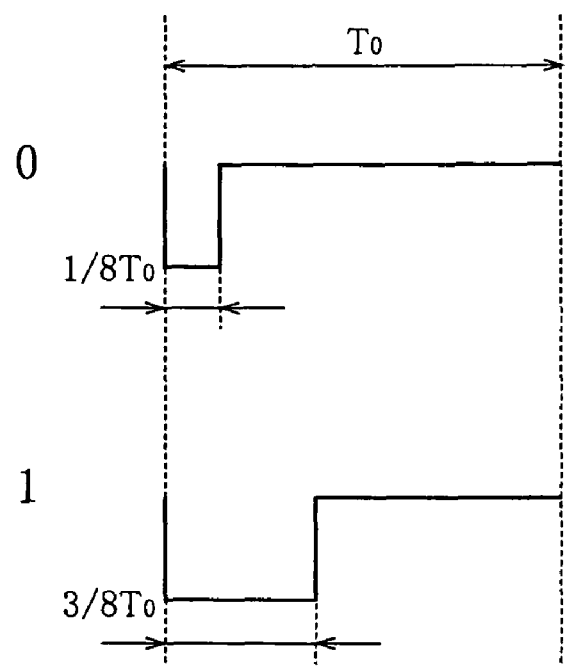
FIG. 33 is a view illustrating "0" signal and "1" signal which are elements of the command frame of FIG. 30.

Referring to FIG. 32, there will be described in detail a structure of the command frame generated in step SWD3 of FIG. 30. The above-described command frame uses unit time $T_0$ for transmission of one-bit information, and consists of "GAP" which is a 2 $T_0$ transmission power-off period, "PREAMBL" which is a 5 $T_0$ transmission power-on period, "CLKSYNC" for transmission of twenty "0" signals, "COMMAND" which are the contents of the commands, "SET UP" which is a 8 $T_0$ transmission power-on period, and "SYNC" for transmission of one "1" signal. The "COMMAND" which is interpreted by the tag consists of "SOF" indicating the start of the commands, "CMD" which are the commands indicated in FIG. 20, "PTR" which is a pointer specifying the memory address of the selected or desired RFID tag circuit 24A, "LEN" which indicates the length of the information to be written, "VAL" which is the content of information to be written, "P" which is parity information of "PTR", "LEN" and "VAL", and "EOF" which indicates the end of the commands.

The command frame described above is a series of elements consisting of the "0" and "1" signals indicated in FIG. 22, and the transmission power-on and power-off periods. For the operation to identify the desired RFID tag circuit 24A on which the information is to be written, or the operation to write the information on the RFID tag circuit 24A. The modulating information in the form of the TX-ASK signal on the basis of the command frame is supplied to the carrier-wave modulating portion 138 of the communication circuit 56, and the carrier wave is subjected to ASK modulation by the carrier-wave modulating portion 138, so that the modulated carrier wave is transmitted to the RFID tag circuit 24A. The RFID tag circuit 24A which receives the modulated carrier wave performs the information writing on the memory portion 74 and information replying operation, according to the commands.

Figure 34:
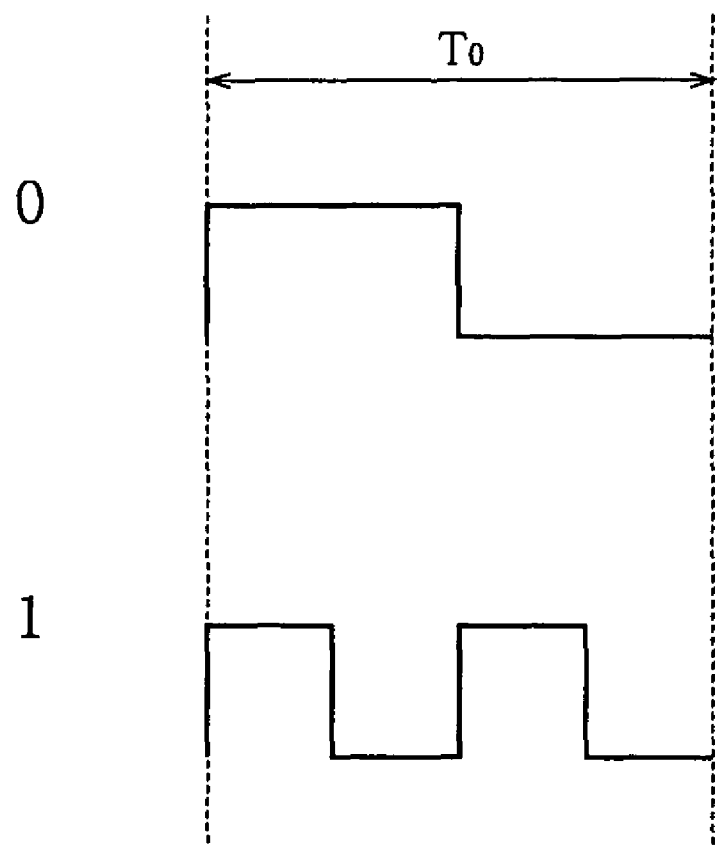
FIG. 34 is a view illustrating "0" signal and "1" signal used for generation of a reply signal transmitted from the RFID tag of FIG. 3.
Figure 35:
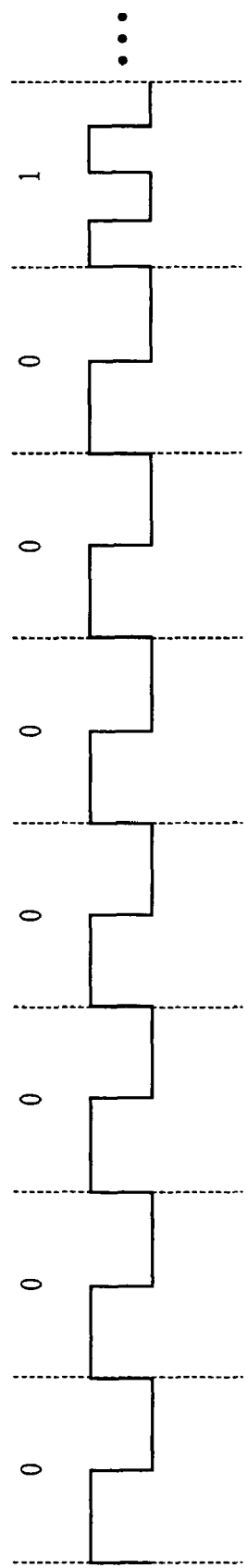
FIG. 35 is a view illustrating an example of an ID signal specific to the RFID tag of FIG. 3.

In the information replying operation of the RFID tag circuit 24A, reply information discussed below in detail is constituted by a series of elements consisting of FKS-modulated "0" and "1" signals indicated in FIG. 34. On the basis of these signals, the carrier wave is reflection-modulated, and transmitted to the RFID-tag fabricating apparatus 12. In the operation to identify the desired RFID tag circuit 24A, for instance, a reflected wave modulated according to an ID signal specific to the RFID tag circuit 24A, which is shown in FIG. 35, is transmitted to the RFID-tag fabricating apparatus 12.

Figure 36:
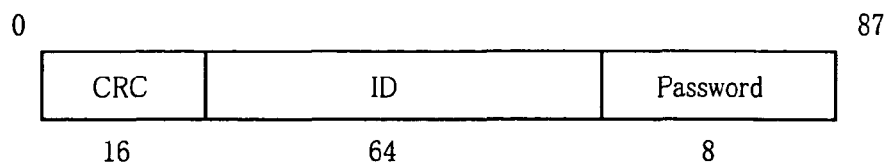
FIG. 36 is a view illustrating a memory structure of the RFID tag of FIG. 3.
Figure 37:
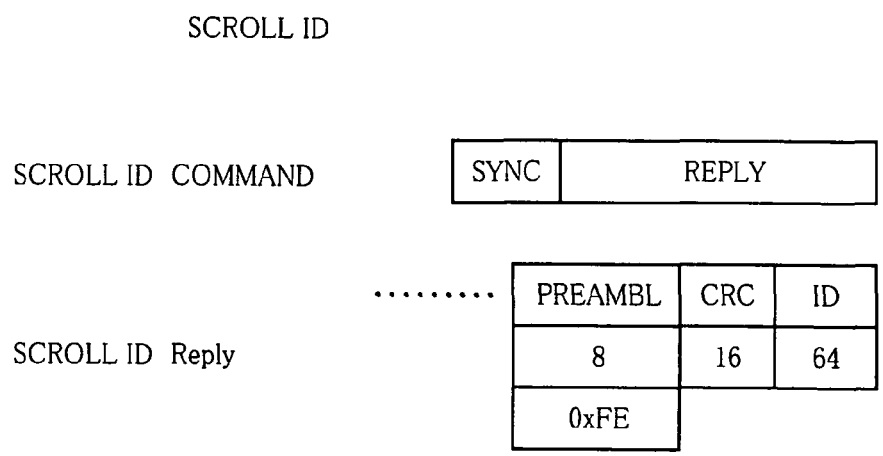
FIG. 37 is a view for explaining "SCROLL ID Reply" transmitted in response to a signal including a "SCROLL ID", when the signal is received by the RFID tag of FIG. 3.

Referring to FIG. 36, there will be described an arrangement of the memory of the RFID tag circuit 24A. As shown in FIG. 36, the memory portion 74 of the RFID tag circuit 24A stores a result of calculation of the CRC sign value, the ID specific to the desired RFID tag circuit 24A, and a password. When a signal including the "SCROLL ID" command as shown in FIG. 37 is received, the generated reply signal consists of the 8-bit "PREAMBL" signal represented by 0×FE, "CRC" representing the result of calculation of the CRC sign value stored in the memory portion 74, and the "ID" identifying the RFID tag circuit 24A.

Figure 38:
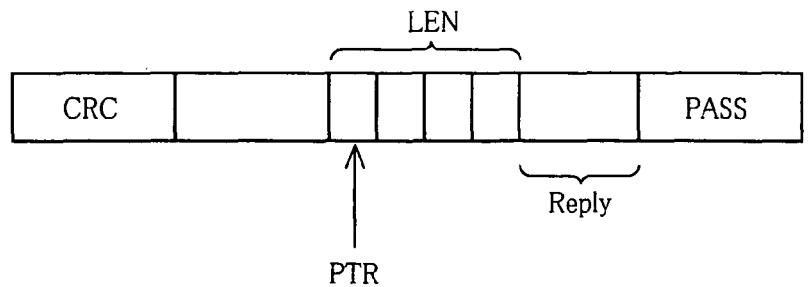
FIG. 38 is a view for explaining extraction of information following "LEN" which is a part of the information stored in a memory portion shown in FIG. 3.

The above-described "PING" command of FIG. 31 is used to read out information stored in the memory portion 74 of each of the plurality of RFID tag circuits 24A, which information corresponds to the "CRC" and "ID", that is, to specify the reading start position. As shown in FIG. 32, the "PING" command includes the start address pointer "PTR", the data length "LEN", and the value "VAL. Where the number of data sets stored in the memory portion 74, which number is represented by the data length "LEN" as counted from the address represented by the pointer "PTR", is equal to a value represented by the value "VAL", as indicated in FIG. 38, the reply signal consists of 8-bit data sets following the address (PTR+LEN+1). If the number of the data sets stored in the memory portion 74 as represented by the data length "LEN" as counted from the address represented by the pointer "PTR" is not equal to the value represented by the value "VAL", the reply signal is not generated.

Figure 39:
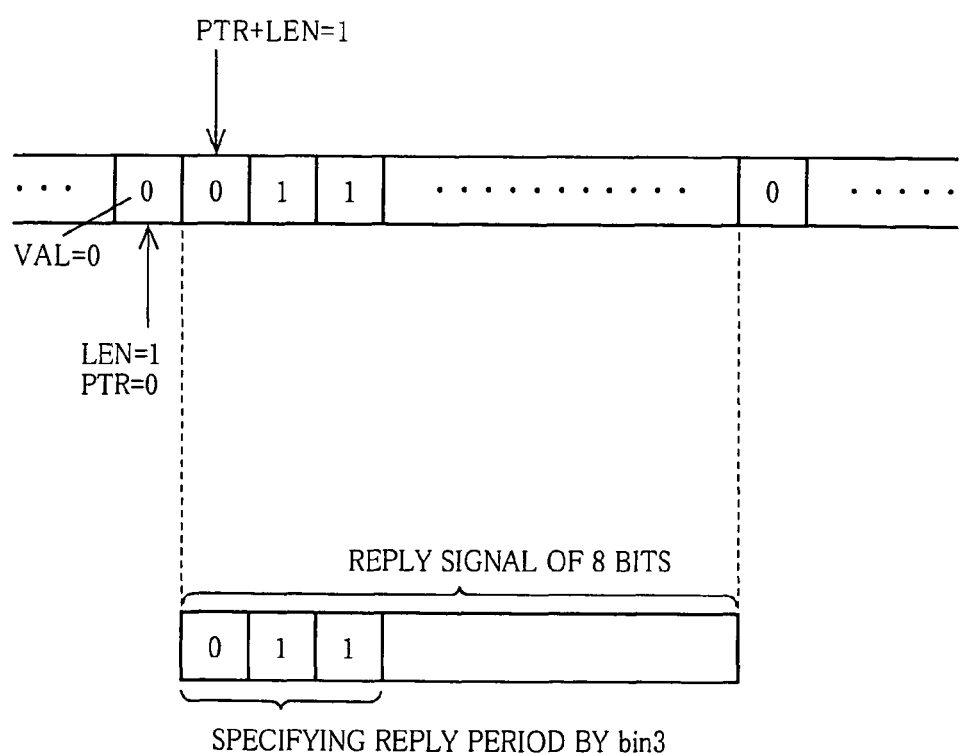
FIG. 39 is a view showing in detail the "SCROLLED ID Reply" of FIG. 26.
Figure 40:
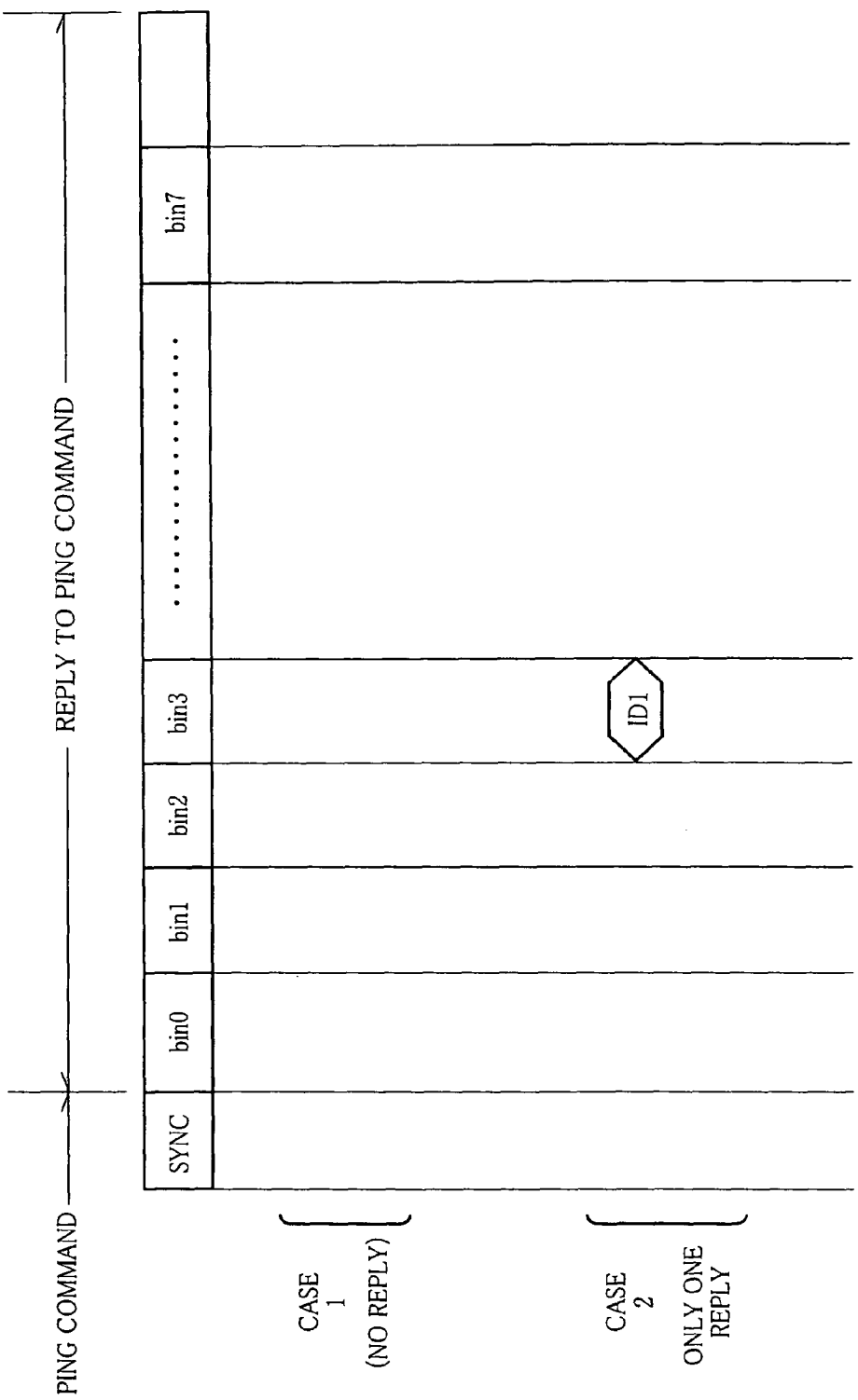
FIG. 40 is a view indicating an example of a reply from an RFID tag, which possibly takes place when the RFID-tag fabricating apparatus of FIG. 2 operates to identify the RFID tags located within an area of possible radio communication.

The timing at which the RFID tag circuit 24A replies to the "PING" command is determined by upper three bits of the reply signal. That is, the reply signal is transmitted during one of periods "bin0" through "bin7" separated from each other by "BIN" pulses transmitted from the RFID-tag fabricating apparatus 12, following the "PING" command. Where the "PIN" command includes "PTR=0", "LEN=1" and "VAL=0", for example, as shown in the upper part of FIG. 39, the RFID tag circuit 24A wherein the first bit stored in the memory portion 74 is equal to "0" represented by the value "VAL" extracts a signal as shown in the lower part of FIG. 39, and incorporates this signal into the reply signal. Where the upper three bits of the reply signal are "0", "1" and "1", the reply signal is transmitted in response to the "PING" command, during a reply period "bin3" as indicated in FIG. 40.

Figure 41:
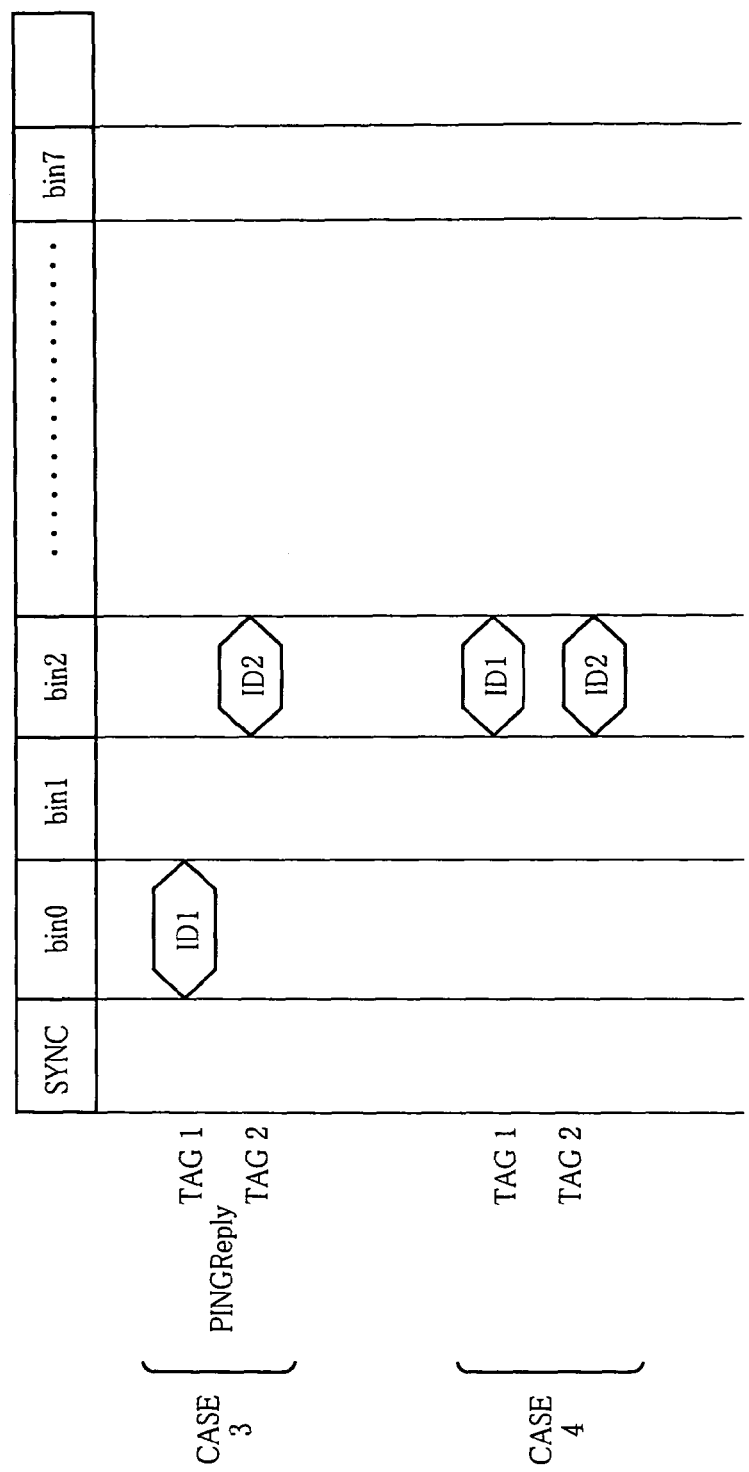
FIG. 41 is a view indicating another example of a reply from an RFID tag, which possibly takes place when the RFID-tag fabricating apparatus of FIG. 2 operates to identify the RFID tags located within the area of possible radio communication.

The reply to the "PING" command differs depending upon the number of the tags, as described below. That is, where any RFID tag 24 is present within the communication area of the RFID-tag fabricating apparatus 12, no reply is transmitted, as in CASE 1 of FIG. 40. Where one RFID tag circuit 24A is present within the communication area, the reply signal indicating "ID1" is transmitted during the period "bin3", for example, as in CASE 2 of FIG. 40. Where two RFID tag circuits 24A are present within the communication area, the reply signal indicating "ID1" is transmitted during a period "bin0", for example, while the reply signal indicating "ID2" is transmitted during a period "bin2", for example, as in CASE 3 of FIG. 41. Where two RFID tag circuits 24A are present within the communication area, the reply signal indicating "ID1" and the reply signal indicating "ID2" are transmitted during the period "bin2", for example, as in CASE 4 of FIG. 41, if the value of the upper three bits of ID1 and that of the upper three bits of ID2 are equal to each other. The number of the RFID tag circuits 24A within the communication area and the ID of each of those circuits 24A can be obtained by repetition of the "PING" command after changing "PTR", "LEN" and "VAL". By using the obtained ID, the information writing on the desired or selected RFID tag circuit 24A can be effected.

Figure 42:
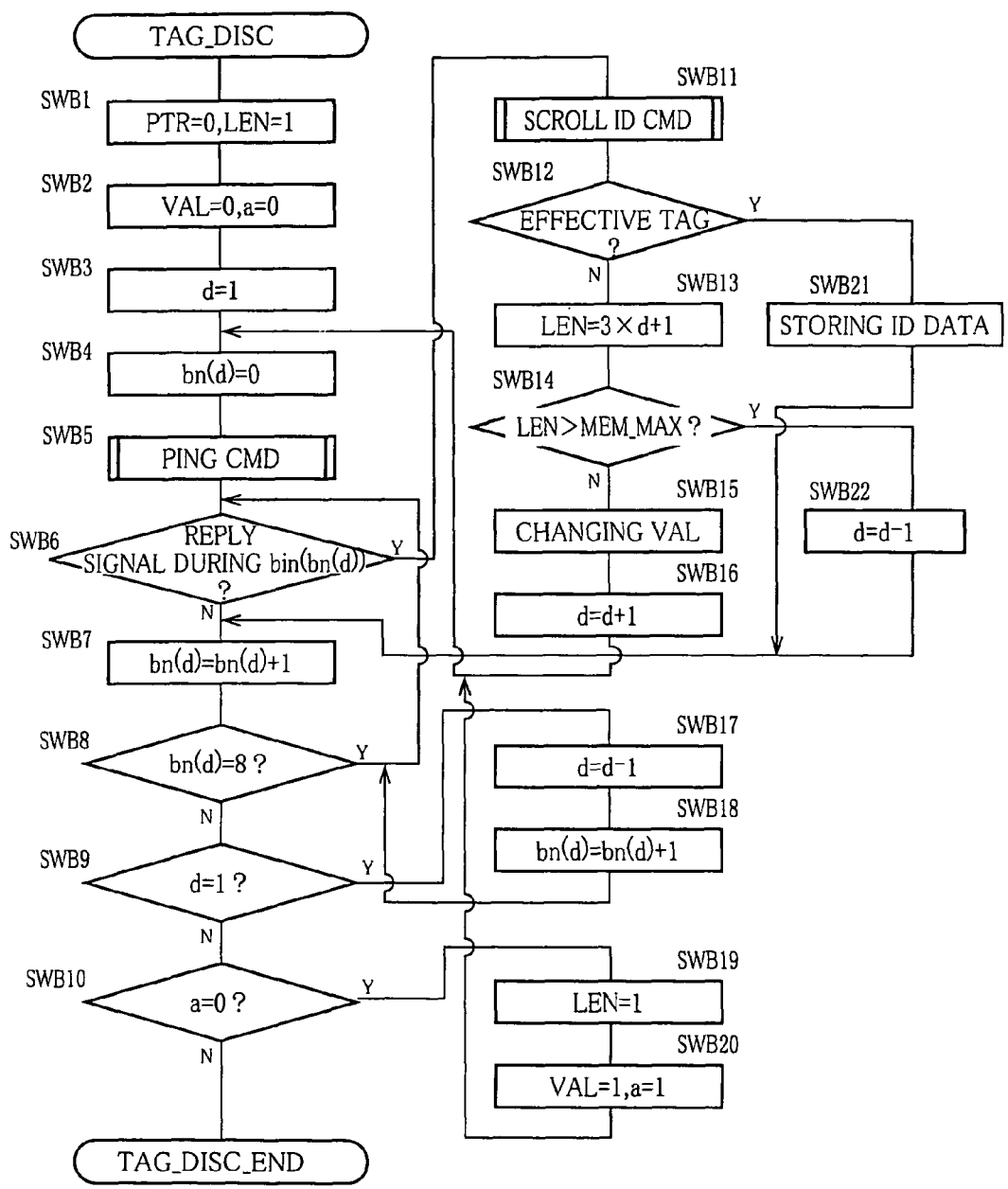
FIG. 42 is a flow chart illustrating an operation to identify the RFID tag selected for information writing thereon, in step SWB of FIG. 28.

Referring to the flow chart of FIG. 42, there will be described an operation in step SWB of FIG. 28 to identify the selected RFID tag circuit 24A on which the information is to be written. Initially, step SWB1 is implemented to set "PTR=0" and "LEN=1", and step SWB2 is implemented to set "VAL=0" and a leading data flag "a=0". Then, step SWB3 is implemented to set "1" as a value "d" indicative of the number of repetition of the "PING" command, and step SWB4 is implemented to set "0" as "bn(d)" indicative of bin number in the above-indicated value "d". Step SWB5 is implemented to generate the "PING" command frame. Then, step SWB6 is implemented to determine whether the reply signal is present at "bin(bn(d))", namely, at "bin0". If an affirmative decision is obtained in step SWB6, it is estimated that the leading four bits in the memory portion 74 of the selected RFID tag are "0", "0", "0" and "0". In this case, step SWB11 is implemented to generate the "SCROLL ID" command frame according to the estimation, and transmit the generated command frame, so that the CRC sign and ID of the selected RFID tag circuit 24A can be read. Then, step SWB12 is implemented to calculate the value of the CRC sign of the read ID, and compare the calculated value with the value of the received CRC sign, for determining whether the ID in question is effective or not, depending upon whether the calculated value is equal to the value of the received CRC sign. If an affirmative decision is obtained in step SWB12, it is determined that the read ID is effective. In this case, step SWB21 is implemented to store the ID data, and step SWB7 is then implemented. If a negative decision is obtained in step SWB6, step SWB7 is also implemented. In this step SWB7, "1" is added to the bin number "dn(d)". Then, step SWB8 is implemented to determine whether the bin number "bin(d)" has increased to "8" which is a total number of the bin periods. If a negative decision is obtained in step SWB8, the above-described step SWB6 and the following steps are implemented again. If an affirmative decision is obtained in step SWB8, step SWB9 is implemented to determine whether the "d" indicative of the number of repletion of the "PING" command is equal to "1". If a negative decision is obtained in this step SWB9, step SWB17 is implemented to add "1" to "d", and step SWB18 is implemented to add "1" to "bn(d)". Then, the above-described step SWB6 and the following steps are implemented again. If an affirmative decision is obtained in step SWB8, this means that all of the RFID tag circuits 24A having the same leading data in the memory area 74 have been checked, so that step SWB10 is then implemented. If a negative decision is obtained in step SWB12, it is possible that a plurality of RFID tags have replied during the period "bin(bn(d))". In this case, it is necessary to check in more detail the ID data of the RFID tag circuits 24A, by generating and transmitting again a new "PING" command on the basis of the data obtained from the previous "PING" commands. In this case, step SWB13 is first implemented to calculate again the length of the length data "LEN". Then, step SWB 14 is implemented to determine whether the length of the length data "LEN" is larger than a total number "MEN MAX" of storage of the memory portion 74. If an affirmative decision is obtained in step SWB14, this means that all data in the memory portion 74 have been read out and that the data in the memory portion 74 have some error or defect. In this case, the ID data are not stored, and step SWB 22 is implemented to subtract "1" from "d" to effect determination for the next BIN period. If a negative decision is obtained in step SWB14, it is necessary to check in more detail the ID data of the RFID tag circuit 24A. In this case, step SWB15 is implemented to change the value "VAL" on the basis of the data obtained from the previous "PING" command. Then, step SWB16 is implemented to add "1" to "d", and the step SWB4 and the following steps are implemented. In step SWB10, a determination as to whether the value of the leading bit data flag "a" is equal to "0". If an affirmative decision is obtained in step SWB10, this means that all of the RFID tag circuits 24A wherein the leading data in the memory portion 74 are "0" have been checked. In this case, step SWB19 is implemented to set "LEN=1", and step SWB20 is implemented to set "VAL=1" and the leading bit data flag "a=1". Then, the step SWB4 and the following steps are implemented again. If a negative decision is obtained in step SWB10, the ID data of all of the RFID tag circuits 24A within the communication area have been checked. In this case, the execution of the present routine is terminated. If a plurality of RFID tag circuits 24A have been detected according to the present routine, the circuits 24A other than the desired circuit 24A are excluded to inhibit their replies, according to a "Quiet" command which will not be described in detail. To find the desired circuit 24A, the detected circuit 24A having the smallest ID number is selected first for determining whether this circuit 24A is the desired one. If none of the circuit elements 24 is detected, the present routine is terminated with a determination of an error.

Figure 43:
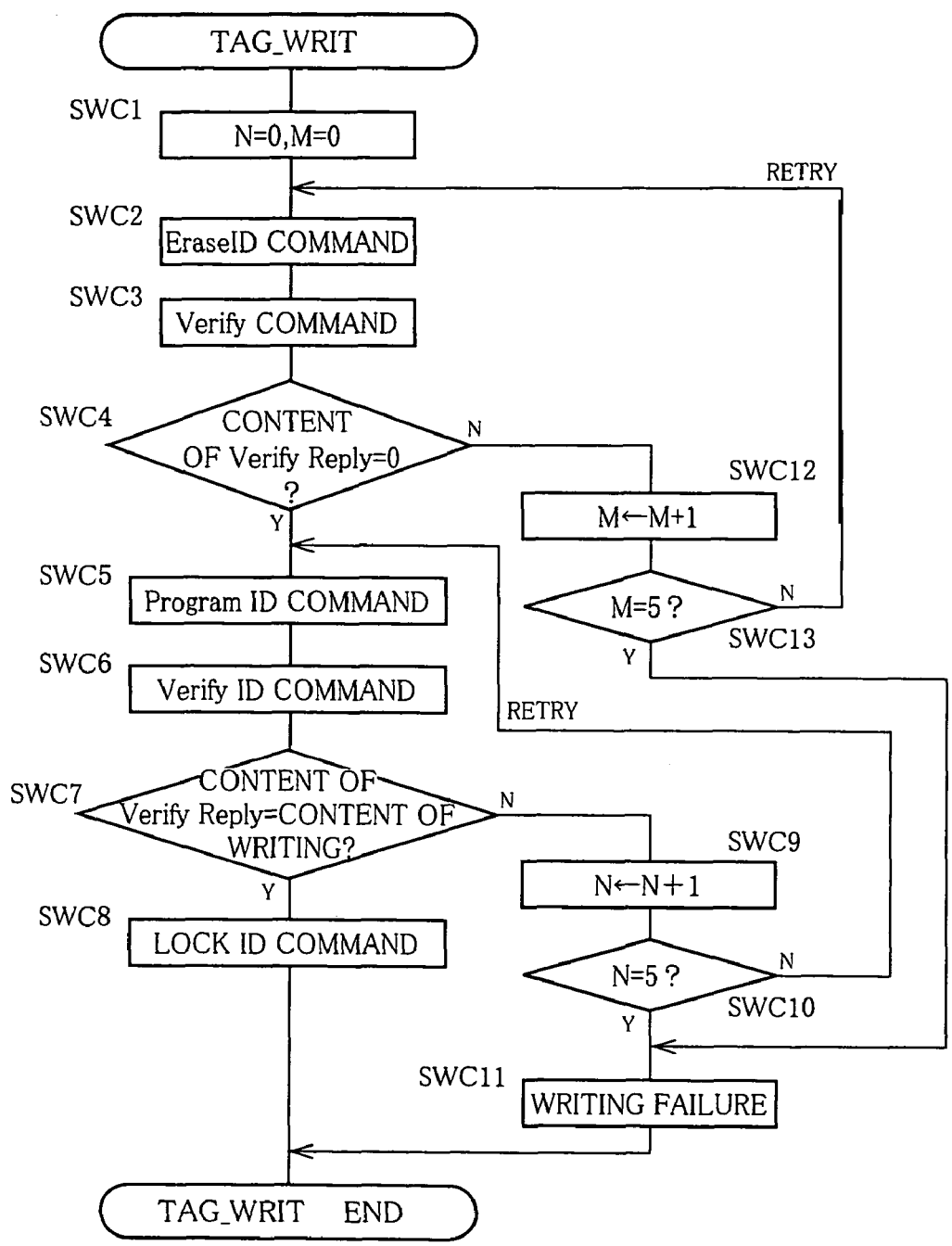
FIG. 43 is a flow chart illustrating an operation to write information on the RFID tag in step SWC of FIG. 28.

Referring to the flow chart of FIG. 43, there will be described the information writing on the RFID tag circuit 24A in step SWC of FIG. 28. Initially, step SWC1 is implemented to set "N=0" and "M=0", and then step SWC2 is implemented so that a signal modulated on the basis of an "ERASE" command is transmitted from the transmission/reception antenna 54, and the memory portion 74 of the desired RFID tag circuit 24A on which the information is to be written is initialized. Then in step SWC3, a signal modulated on the basis of a "VERIFY" command is transmitted from the transmission/reception antenna 54, and step SWC4 is implemented to verify the information stored in the memory portion 74 of the RFID tag circuit 24A, on the basis of the reply signal from the RFID tag circuit 24A, for determining whether the memory portion 74 of this circuit 24A has been correctly initialized. If an affirmative decision is obtained in step SWC4, step SWC5 is implemented so that a signal modulated on the basis of a "PROGRAM" command is transmitted from the transmission/reception antenna 54, and the information is written on the RFID tag circuit 24A. Step SWC7 is then implemented to verify the information stored in the memory portion 74 of that RFID tag circuit 24A, on the basis of the reply signal from the circuit 24A, for determining whether this information is coincident with the information written in step SWC5. If an affirmative decision is obtained in step SWC7, step SWC8 is implemented so that a signal modulated on the basis of a "LOCK" command is transmitted from the transmission/reception antenna 54, to inhibit writing of new information on the RFID tag circuit 24A, and the execution of the present routine is terminated. If a negative decision is obtained in step SWC7, step SWC9 is implemented to set "N+1" to "N", and step SWC10 is then implemented determine whether "N", is equal to "5". If a negative decision is obtained in step SWC10, the step SWC5 and the following steps are implemented again. If an affirmative decision is obtained in step SWC10, namely, if the information writing operation in the step SWC 5 and the following steps fails five or more times, step SWC11 is implemented to confirm this failure of the information writing on the RFID tag circuit 24A, and the execution of the present routine is terminated. If a negative decision is obtained in step SWC4, that is, if it is determined that the memory portion 74 of the RFID tag circuit 24A has not been correctly initialized, step SWC-12 is implemented to set "M+1" to "M", and step SWC13 is then implemented to determine whether "M" is equal to "5". If a negative decision is obtained in step SWC13, the step SWC2 and the following steps are implemented again. If an affirmative decision is obtained in step SWC13, that is, if the initializing operation in the step SWC2 and the following steps fails five or more times, step SWC11 is implemented to confirm this failure of the information writing on the RFID tag circuit 24A, and the execution of the present routine is terminated. According to the present routine described above, the desired information can be written on the RFID tag circuit 24A located within the communication area.

Figure 44:
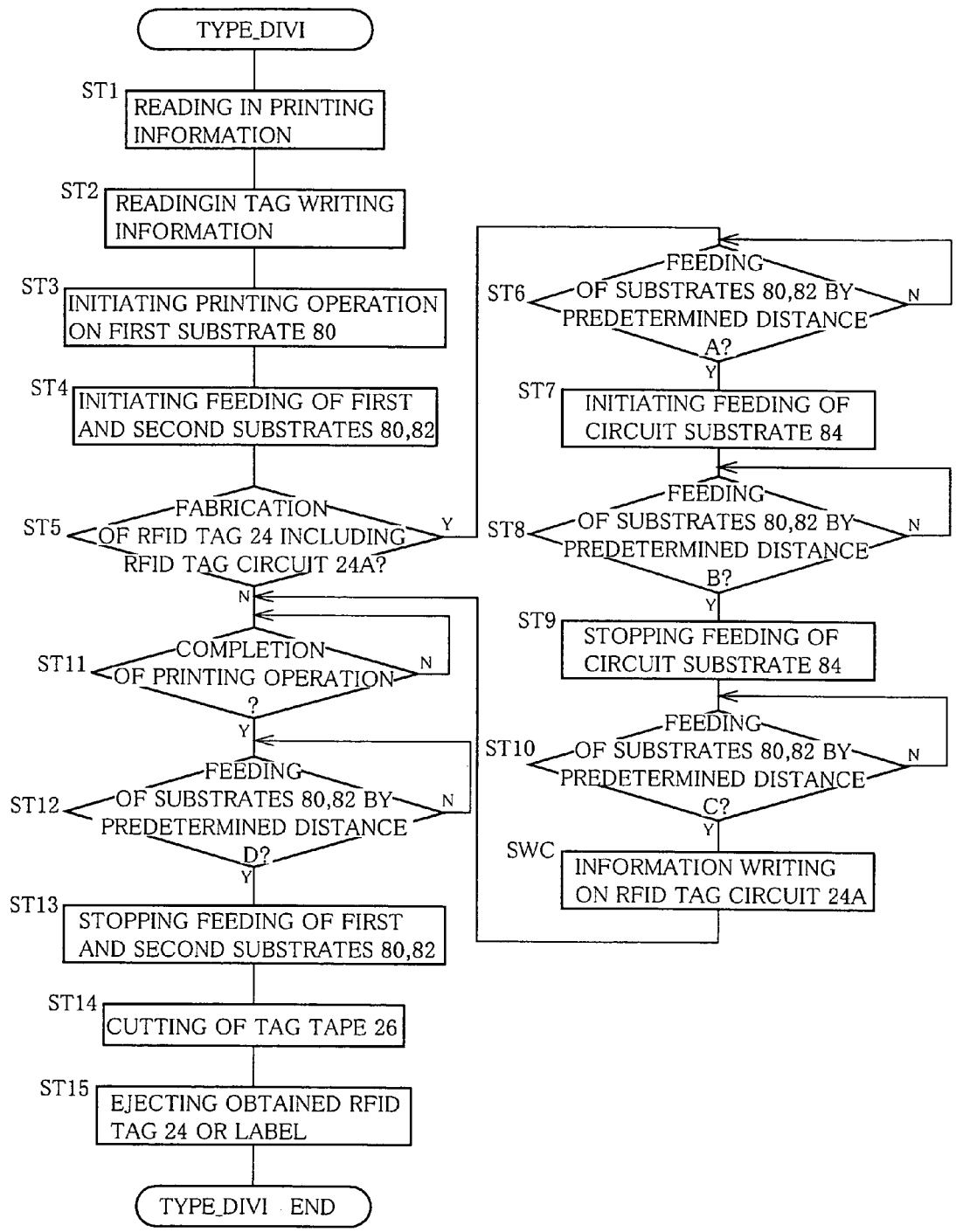
FIG. 44 is a flow chart illustrating an operation to effect printing on a tag tape and an operation to cut the tag tape, in the step SWC of FIG. 28, which are performed concurrently with the operation to write information on the RFID tag.

Referring to the flow chart of FIG. 44, there will be described a printing operation on the tag tape 26 and an operation to feed and cut the tag tape 26, which are performed concurrently with the information writing on the RFID tag circuit 24A in step SWC of FIG. 28. Initially, step ST1 is implemented to effect down-loading or up-loading of printing information from the information server 22 through the communication line 14. Then, step ST2 is implemented to effect down-loading or up-loading of the writing information such as the writing ID and commodity information to be written on the IC circuit portion 66 of the RFID tag circuit 24A, from the information server 22 through the communication line 14. Then, step ST3 is implemented to effect the printing operation on the first substrate 80, by means of the above-described thermal head 34 and the printer driver circuit 37, and step ST4 is implemented to initiate the feeding of the first and second substrates 80, 82 by the feed rollers 38. Then, step ST5 corresponding to the circuit-formation judging portion 152 is implemented to determine whether the RFID tag 24 including the RFID tag circuit 24A is to be fabricated. If a negative decision is obtained in step ST5, step ST11 is implemented to determine whether the printing operation on the first substrate 80 is completed. If an affirmative decision is obtained in step ST5, step ST6 is implemented to determine whether the first and second substrates 80, 82 have been fed by a predetermined distance A or not. Step ST6 is repeatedly implemented until an affirmative decision is obtained in this step. When the affirmative decision is obtained in step ST6, step ST7 is implemented to initiate the feeding of the circuit substrate 84 by rotation of the first take-up roller 92. Then, step ST8 is implemented to determine whether the first and second substrates 80, 82 have been fed by a predetermined distance B. Step ST8 is repeatedly implemented until an affirmative decision is obtained in this step. When the affirmative decision is obtained in step ST8, step ST9 is implemented to stop the feeding operation of the circuit substrate 84. Then, step ST10 is implemented to determine whether the first and second substrates 80, 82 have been fed by a predetermined distance C. Step ST10 is repeatedly implemented until an affirmative decision is obtained in this step. When the affirmative decision is obtained in step ST10, step SWC is implemented to write information on the RFID tag circuit 24A, and then step ST11 is implemented to determine whether the printing operation on the first substrate 80 is completed. Step ST 11 is repeatedly implemented until an affirmative decision is obtained in this step. When the affirmative decision is obtained in step ST11, step ST12 is implemented to determine whether the first and second substrates 80, 82 have been fed by a predetermined distance D. Step ST12 is repeatedly implemented until an affirmative decision is obtained in this step. When the affirmative decision is obtained in step ST12, step ST13 is implemented to stop the feeding of the first and second substrates 80, 82. Then, step ST14 corresponding to the is implemented to effect the cutting operation of the tag tape 26 by the cutter 50. Step ST15 is then implemented to eject the RFID tag 24 or the label not including any RFID tag circuit 24A, and the present routine is terminated. The above-described steps ST6-ST10 correspond to the tag-tape-fabrication control portion 154. The present RFID-tag fabricating apparatus 12 is operated according to the control routines described above, to fabricate either the RFID tag 24 provided with the printed indicium and including at least one RFID tag circuit 24A, or the label provided with the printed indicium and not including any RFID tag circuit 24A between the first and second substrates 80, 82 bonded together.

The RFID-tag fabricating apparatus 1 constructed according to the present embodiment of the invention comprises: the first substrate 80 in the form of a tape having a printable surface; the second substrate 82 in the form of a tape to be bonded to the first substrate 80; a printing device in the form of the thermal head 34 operable to form the predetermined printed indicium 102 on the printable surface of the first substrate; a tag-tape forming device in the form of the first take-up roller 92, second take-up roller 98 and pressure roller 100, which is operable to form the tag tape 26, by bonding together the first and second substrates 80, 82 such that the plurality of RFID tag circuits 24A are interposed between the first and second substrates 80, 82; a tag-tape cutting device in the form of the cutter 50 operable to cut the tag tape 26 formed by the tag-tape forming device; and the tag-tape cutting control portion 150 (corresponding to step ST14) operable to change a length of a segment of the tag tape 26 to be obtained as the RFID tag 24 by cutting of the tag tape 26 by the tag-tape cutting device, on the basis of a length of the printed indicium 102 formed on the first substrate 80, and such that the segment includes at least one of the plurality of RFID tag circuits 24A. Thus, the RFID-tag fabricating apparatus 12 is capable of changing the dimensions of the RFID tag 24, depending upon the dimensions of the printed indicium 102 formed on the first substrate 80, namely, the dimensions of the printed indicium provided on the obtained RFID tag 24.

The RFID-tag fabricating apparatus 12 further comprises the circuit-formation judging portion 152 (corresponding to step ST15) operable to determine whether at least one RFID tag circuit 24A is interposed between the first and second substrates 80, 82, and the tag-tape-formation control portion 154 (corresponding to steps ST6 through ST10) operable to control the tag-tape forming device such that any RFID tag circuit 24A is not interposed between the first and second substrates 80, 82, when the circuit-formation judging portion 152 does not determine that at least one RFID tag circuit is interposed between the first and second substrates. Accordingly, the RFID-tag fabricating apparatus 12 is capable of selectively fabricating either the RFID tag 24 including at least one RFID tag circuit 24A, or a label including none of the RFID tag circuits 24A.

The cartridge 28 removably mounted on the RFID-tag fabricating apparatus 12 as the substrate-accommodating device accommodates the first substrate 80 in the form of a tape having a printable surface, and the second substrate 82 in the form of a tape to be bonded to the first substrate 80. The RFID-tag fabricating apparatus 12 comprising the cartridge 28 is capable of changing the dimensions of the RFID tag 24 depending upon the printed indicium 24 provided on the RFID tag 24. Where the length of the printed indicium 102 is relatively large, the RFID tag 24 including only one RFID tag circuit can be fabricated with a length sufficient to accommodate the comparatively long-printed indicium 102.

The second substrate 80 is bonded at one of its opposite surfaces to the first substrate 80, and includes the adhesive layer 108 and releasing layer 110 formed on the other of its opposite surfaces. The fabricated RFID tag 24 can be easily affixed to a desired article such as an article of commodity, by the adhesive layer 108 which is exposed by removing the releasing layer 110.

The cartridge 28 provided as the substrate-accommodating device accommodates also the circuit substrate 84 in the form of a tape carrying a multiplicity of the RFID tag circuits 24A successively arranged at a predetermined pitch in its longitudinal direction, and the tag-tape forming device is arranged to interpose the circuit substrate 84 between the first and second substrates 80, 82 such that at least one IC circuit portion 66 is included in each of segments of the circuit substrate 84 which are separated from each other. Accordingly, each RFID tag 24 has one RFID tag circuit 24A or a plurality of RFID tag circuits 24A, between the first and second substrates 80, 82.

The circuit substrate 84 having the half cuts 118 or lines of perforations 120 arranged at a predetermined spacing pitch in its longitudinal direction can be easily divided into segments by cutting at the predetermined spacing pitch.

Where the circuit substrate 84 takes the form of the roll 90 of the tape, as shown in FIG. 4, the tape of the circuit substrate 84 can be easily fed from the roll 90.

Where the circuit substrate 84 takes the form of a pile of the pile of multiple zigzag folds of the tape, as shown in FIG. 24, the tape of the circuit substrate 84 can be easily fed from the pile, and is not subject to a bending stress and is not broken or otherwise damaged.

Where the surface of the second substrate 82 to be bonded to the first substrate 80 and the surface of the circuit substrate 84 opposed to the first substrate 80 have the same color as in the example of FIG. 9, the fabricated RFID tag 24 has a comfortable color appearance, and the printed indicium 102 formed on the first substrate 80 is easily visible.

Where the surface of the second substrate 82 to be bonded to the first substrate 80 and the surface of the circuit substrate 84 opposed to the first substrate 80 have respective different colors as in the example of FIG. 21, the printed indicium 102 formed in an area of the first substrate 80 aligned with the segment of the circuit substrate 84 is easily perceptible, with the color of the second substrate 82 serving as a frame in which the printed indicium 102 is located.

Where the first substrate 80, second substrate 82 and circuit substrate 84 have the same width dimension, the RFID tags 24 can be easily fabricated.

Where the circuit substrate 84 has a width dimension smaller than that of the first and second substrates 80, 82, the surface area of bonding between the first and second substrates is larger than that where the three substrates 80, 82, 84 have the same width dimension.

Since each of the RFID tag circuits 24A provided on the circuit substrate 84 includes the antenna portion 64 capable of information transmission and reception in a non-contact fashion, the circuit substrate 84 can be cut into individual segments which are subsequently interposed between the first and second substrates 80, 82, at a predetermined spacing pitch in the longitudinal direction of the first and second substrates 80, 82, to form the tag tape 26 by bonding together the first and second substrates 80, 82. The individual RFID tags 24 each having a desired length can be obtained by cutting the tag tape 26 into segments each of which includes at least one RFID tag circuit 24A.

Second Embodiment

Other embodiments of this invention will be described by reference to FIGS. 45-73 wherein the reference signs used in the first embodiment will be used to identify the same elements in the following embodiments, which will not be described.

Figure 45:
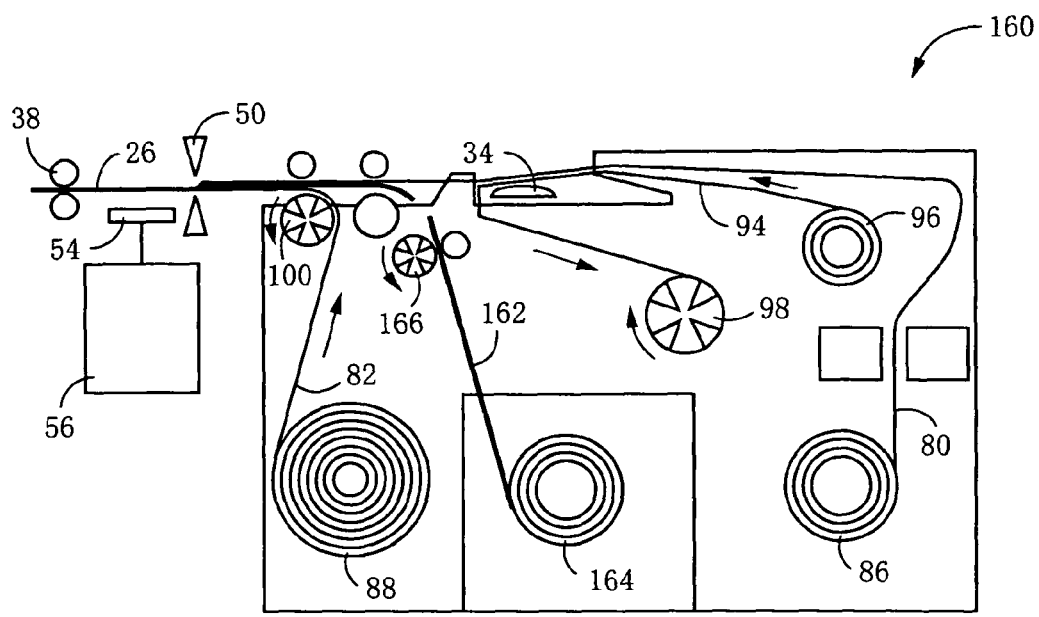
FIG. 45 is a view showing an arrangement of a cartridge constructed according to a second embodiment of this invention.

Referring to FIG. 45, there is shown an arrangement of a cartridge 160 used in a second embodiment of this invention. This cartridge 160 accommodates a first substrate 80 shown in the cross sectional view of FIG. 46, a circuit substrate 162 shown in the cross sectional view of FIG. 47, and a second substrate 82 shown in the cross sectional view of FIG. 48. The circuit substrate 162 takes the form of a third roll 164 of a tape which carries a multiplicity of RFID tag circuits 24A successively arranged at a predetermined pitch on a base film 112 in its longitudinal direction. The circuit substrate 162 has half cuts 118 or lines of perforations 120 formed successively in the longitudinal direction at a predetermined spacing pitch, so that the circuit substrate 162 can be easily divided into segments each having the RFID tag circuit 24A, when the base film 112 is tensioned or stretched in the longitudinal direction. The cartridge 170 accommodates a feed roller 166 rotated to feed the circuit substrate 162 between the first and second substrates 80, 82. This feed roller 166 is rotated in the direction indicated by the arrow-headed line in FIG. 45, by the second cartridge drive motor 31.

Figure 48:
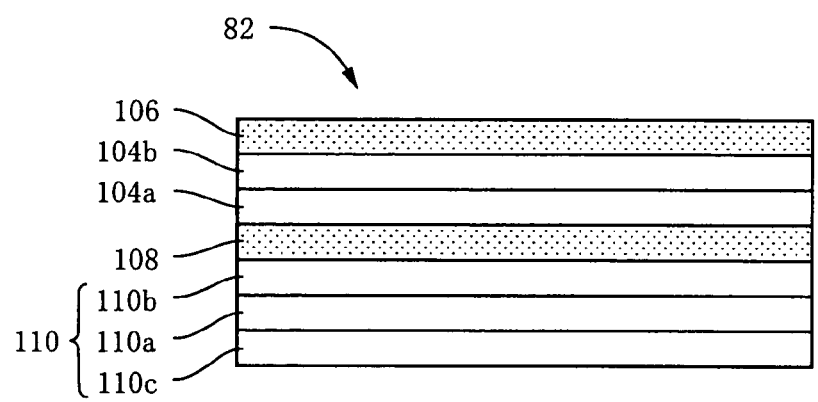
FIG. 48 is an elevational view in cross section of a second substrate accommodated in the cartridge of FIG. 45.

As shown in detail in FIG. 48, the base film 104 of the second substrate 82 consists of a tape substrate 104a formed of PET, for example, and a base color layer 104b formed on the front surface of the tape substrate 104a which is to be bonded to the first substrate 80. An adhesive layer 106 is formed on the front surface of the base color layer 104b, while an adhesive layer 108 is formed on the back surface of the tape substrate 104a. Further, the releasing layer 110 of the second substrate 82 consists of a substrate layer 110a formed of a glassine paper, for example, a silicone layer 110b formed on the front surface of the substrate layer 110a to be bonded to the base film 104, and another silicone layer 110c formed on the back surface of the substrate layer 110a. Preferably, the circuit substrate 162 has a width dimension smaller than that of the first and second substrates 80, 82.

In the cartridge 160 shown in FIG. 45, the second take-up roller 98 and the pressure roller 100 are rotated by the first cartridge drive motor 30 in the directions indicated by the arrow-headed lines, to feed the first and second substrates 80, 82 in the directions indicated by the arrow-headed lines, while these substrates 80, 82 are bonded together. At the same time, the feed roller 166 is rotated by the second cartridge drive motor 31 in the direction indicated by the arrow-headed line in FIG. 45, to feed the circuit substrate 162 such that the circuit substrate 162 is inserted between the first and second substrates 80, 82. When a predetermined length of the circuit substrate 162 has been inserted between the first and second substrates 80, 82, the rotation of the feed roller 166 is stopped, while the second take-up roller 98 and the pressure roller 100 are kept rotated, so that the circuit substrate 162 is tensioned or stretched in the longitudinal direction, whereby the leading portion of the circuit substrate 162 is cut off from the trailing portion at the half cut 118 or line of perforation 120. Thus, the tag tape 26 including the RFID tag circuit 24A is prepared. In the present embodiment, the second take-up roller 98, pressure roller 100 and feed roller 166 constitute the tag-tape forming device. The prepared tag tape 26 is cut by the cutter 50 to obtain the FID tag 24 which has a predetermined length and includes the antenna portion 64 and the IC circuit portion 66 formed between the first and second substrates 80, 82 bonded together, as shown in FIG. 9.

Third Embodiment

Figure 49:
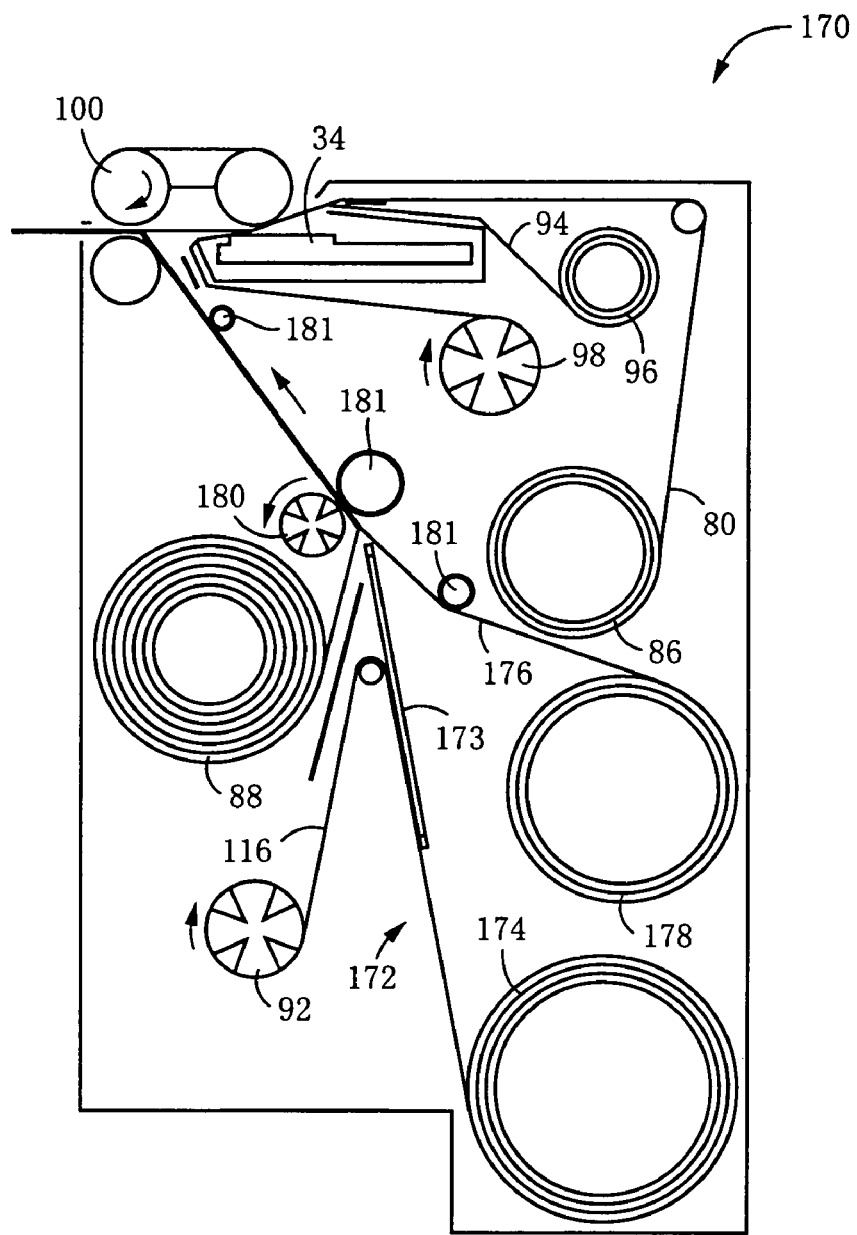
FIG. 49 is a view showing an arrangement of a cartridge constructed according to a third embodiment of this invention.
Figure 50:
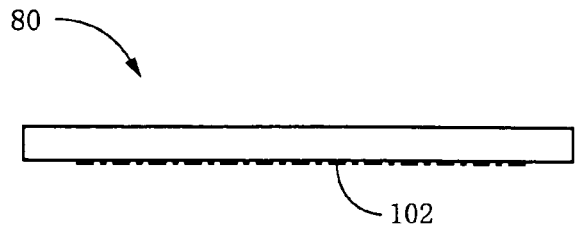
FIG. 50 is an elevational view in cross section of a first substrate accommodated in the cartridge of FIG. 49.

Referring to FIG. 49, there is shown an arrangement of a cartridge 170 used in a third embodiment of this invention. This cartridge 170 accommodates a first substrate 80 shown in the cross sectional view of FIG. 50, an intermediate substrate 176 shown in the cross sectional view of FIG. 51, a circuit substrate 172 consisting of planar elements 173 shown in the cross sectional view of FIG. 52, and a second substrate 82 shown in the cross sectional view of FIG. 53. The circuit substrate 172 takes the form of a third roll 174 including the releasing layer 116 to which a multiplicity of planar elements 173 in the form of strips are bonded through adhesive layers formed on their back surfaces, such that the planar elements 173 are successively arranged in the longitudinal direction of the releasing layer 116. Each of those elements 173 of the circuit substrate 172 carries one RFID tag circuit 24A fixed to the base film 112. The releasing layer 116 carrying the elements 173 is wound as a third roll 174 as shown in FIG. 49. The intermediate layer 176 takes the form of a fourth roll 178 of a tape to be bonded to the first and second substrates 80, 82. The cartridge 17 further accommodates a second pressure roller 180 and three rollers 181 for pressing the second substrate 82 and the intermediate substrate 176 onto each other and feeding these substrates 82, 176 in the direction indicated by the arrow-headed line in FIG. 49. The cartridge 170 supports third and fourth rolls 174 178, the second pressure roller 180 and the pinch rollers 181, rotatably about their axes. The surface of each pinch roller 181 is treated to prevent adhesion of an adhesive material to the surface. For instance, each pitch roller 181 is coated with a silicone resin. The pitch roller 181 may be toothed rollers having a reduced surface area of contact with the adhesive layer. The second pressure roller 180 is rotated in the direction by the first cartridge drive motor 30 in the direction indicated by the arrow-headed line, in synchronization with the second take-up roller 98 and the first pressure roller 100.

Figure 51:
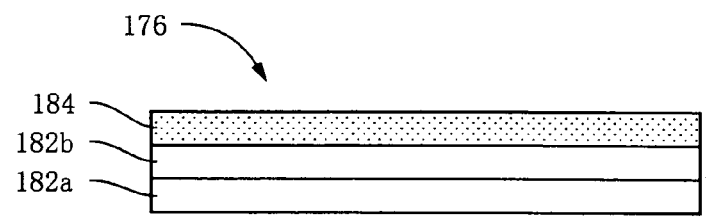
FIG. 51 is an elevational view in cross section of an intermediate substrate to be accommodated in the cartridge of FIG. 49.
Figure 52:
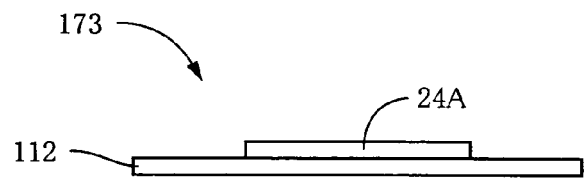
FIG. 52 is an elevational view in cross section of a circuit substrate accommodated in the cartridge of FIG. 49.
Figure 53:
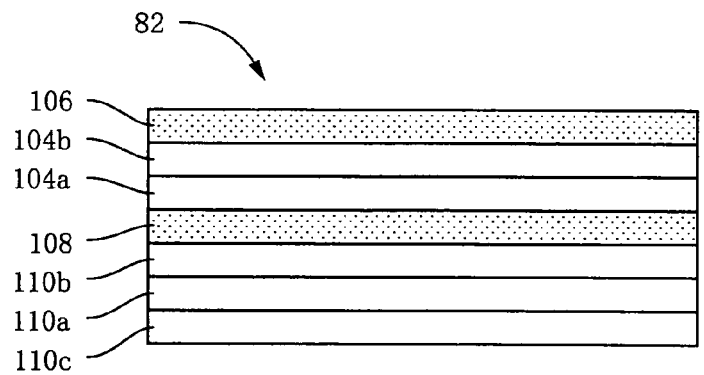
FIG. 53 is an elevational view in cross section of a second substrate accommodated in the cartridge of FIG. 49.

As shown in detail in FIG. 51, the intermediate substrate 176 consists of a colored base film 182 formed of PET, for example, and an adhesive layer 184 formed on the front surface of the base film 182 to be bonded to the first substrate 180. Like the base film 104 of the second substrate 82, the base film 182 consists of a tape substrate 182a formed of PET, for example, and a base color layer 182b formed on the front surface of the tape substrate 182a. The planar elements 173 of the circuit substrate 172 used in this third embodiment corresponds to the local portions of the circuit substrate 162 used in the second embodiment, which local portions carry the respective RFID tag circuits 24A.

In the cartridge 170 shown in FIG. 49, the second take-up roller 98, first pressure roller 100 and second pressure roller 180 are rotated by the first cartridge drive motor 30 in the directions indicated by the arrow-headed lines, to feed the second substrate 82 and the intermediate substrate 176 in the directions indicated by the arrow-headed lines, while these substrates 82, 176 are bonded together. At the same time, the first take-up roller 92 is rotated by the second cartridge drive motor 31 in the direction indicated by the arrow-headed line in FIG. 49, to remove the releasing layer 116 from the circuit substrate 172 and insert the leading element 173 of the circuit substrate 172 between the second substrate 82 and the intermediate substrate 176. When the leading portion of the leading element 173 has been inserted between the substrates 82 and 176, the rotation of the first take-up roller 92 is stopped while the second-take up roller 98 and pressure roller 100 are kept rotated, so that the leading element 173 is sandwiched between the second and intermediate substrates 82, 176 bonded together. The pressure roller 100 is rotated by the first cartridge drive motor 30 in the direction indicated by the arrow-headed line, in synchronization with the rotary motions of the rollers 92, 98, 180, the first substrate 80 on which the printed indicium 102 has been formed by the thermal head 34 is bonded to the intermediate substrate 176 through the adhesive layer 184. In the present embodiment, the first and second take-up rollers 92, 98, and the first and second pressure rollers 100, 180 constitute the tag-tape forming apparatus. The prepared tag tape 26 is cut by the cutter 50 to obtain the RFID tag 24 which has a predetermined length and includes the antenna portion 64 and the IC circuit portion 66 formed between the first and second substrates 80, 82 bonded together.

In the present embodiment, the circuit substrate 172 includes the mutually separate planar elements 173 which carry the respective RFID tag circuits 24A each including the IC circuit portion 66 and the antenna portion 64 connected to the IC circuit portion 66, and which are sequentially inserted between the first and second substrates 80, 82.

Further, the intermediate substrate 176 interposed between the first substrate 80 and the circuit substrate 172 protects the IC circuit portions 66. Where the color of the intermediate substrate 176 is suitably selected depending upon the color of the printed indicium 102 formed on the first substrate 80, the intermediate substrate 176 permits easy reading of the printed indicium 102.

Fourth Embodiment

Figure 54:
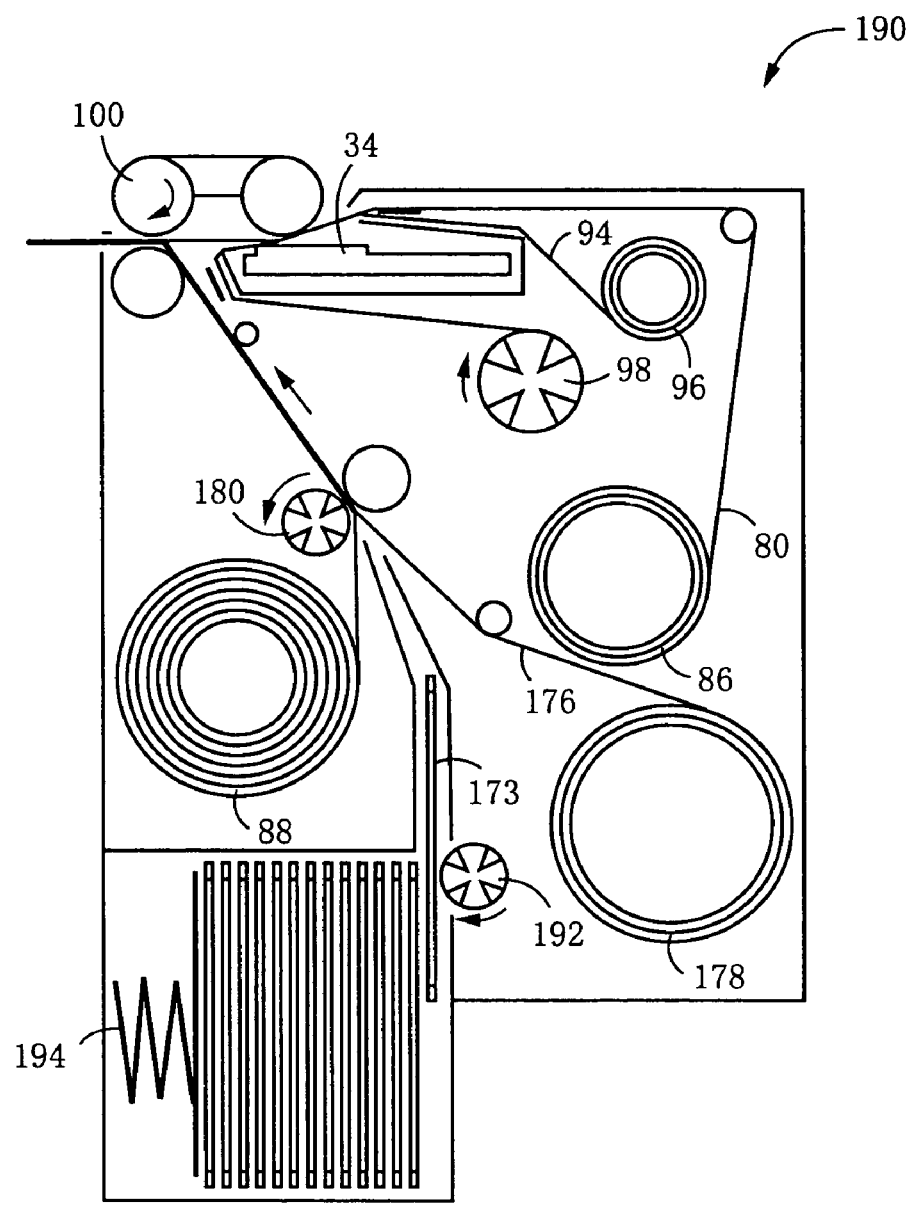
FIG. 54 is a view showing an arrangement of a cartridge constructed according to a fourth embodiment of this invention.

Referring to FIG. 54, there is shown an arrangement of the cartridge 190 used in a fourth embodiment of this invention. This cartridge 190 accommodates a pile of the planar elements 173 in the form of strips described above with respect to the circuit substrate 172 used in the third embodiment of FIG. 49. However, each of the planar elements 173 of this pile is not provided on its back surface with an adhesive layer. The cartridge 190 further accommodates a feed roller 192 for feeding the planar elements 173 and inserting these planar elements 173 between the second and intermediate substrates 82, 176, and a spring 194 for biasing the pile of the planar elements 173 toward the feed roller 192. The feed roller 192 is rotated by the second cartridge drive motor 31 in the direction indicated by the arrow-headed line in FIG. 54.

In the cartridge 190 shown in FIG. 54, the second take-up roller 98, first pressure roller 100 and second pressure roller 180 are rotated by the first cartridge drive motor 30 in the directions indicated by the arrow-headed lines, to feed the second substrate 82 and the intermediate substrate 176 in the directions indicated by the arrow-headed lines, while these substrates 82, 176 are bonded together. At the same time, the feed roller 192 is rotated by the second cartridge drive motor 31 in the direction indicated by the arrow-headed line in FIG. 49, to feed the uppermost circuit substrate element 173 from the pile, in the presence of a biasing force produced by the spring 194, so that the uppermost element 173 is inserted between the second substrate 82 and the intermediate substrate 176. When the leading portion of the uppermost element 173 fed from the pile has been inserted between the substrates 82 and 176, the rotation of the feed roller 192 is stopped while the second-take up roller 98 and pressure roller 100 are kept rotated, so that the element 173 is sandwiched between the second and intermediate substrates 82, 176 bonded together. The pressure roller 100 is rotated by the first cartridge drive motor 30 in the direction indicated by the arrow-headed line, in synchronization with the rotary motions of the rollers 92, 98, 192, so that the first substrate 80 on which the printed indicium 102 has been formed by the thermal head 34 is bonded to the intermediate substrate 176 through the adhesive layer 184. In the present embodiment, the second take-up roller 98, first pressure roller 100, feed roller 192 and spring 194 constitute the tag-tape forming apparatus. The prepared tag tape 26 is cut by the cutter 50 to obtain the RFID tag 24 which has a predetermined length and includes the antenna portion 64 and the IC circuit portion 66 formed between the first and second substrates 80, 82 bonded together.

In the present fourth embodiment described above, a pile of the planar elements 173 which are superposed on each other and each of which includes at least one RFID tag circuit 24A is used as the circuit substrate. The RFID tag circuits 24A in the pile of the planar elements 173 are not subject to a bending stress, and are not broken or otherwise damaged.

Fifth Embodiment

Figure 55:
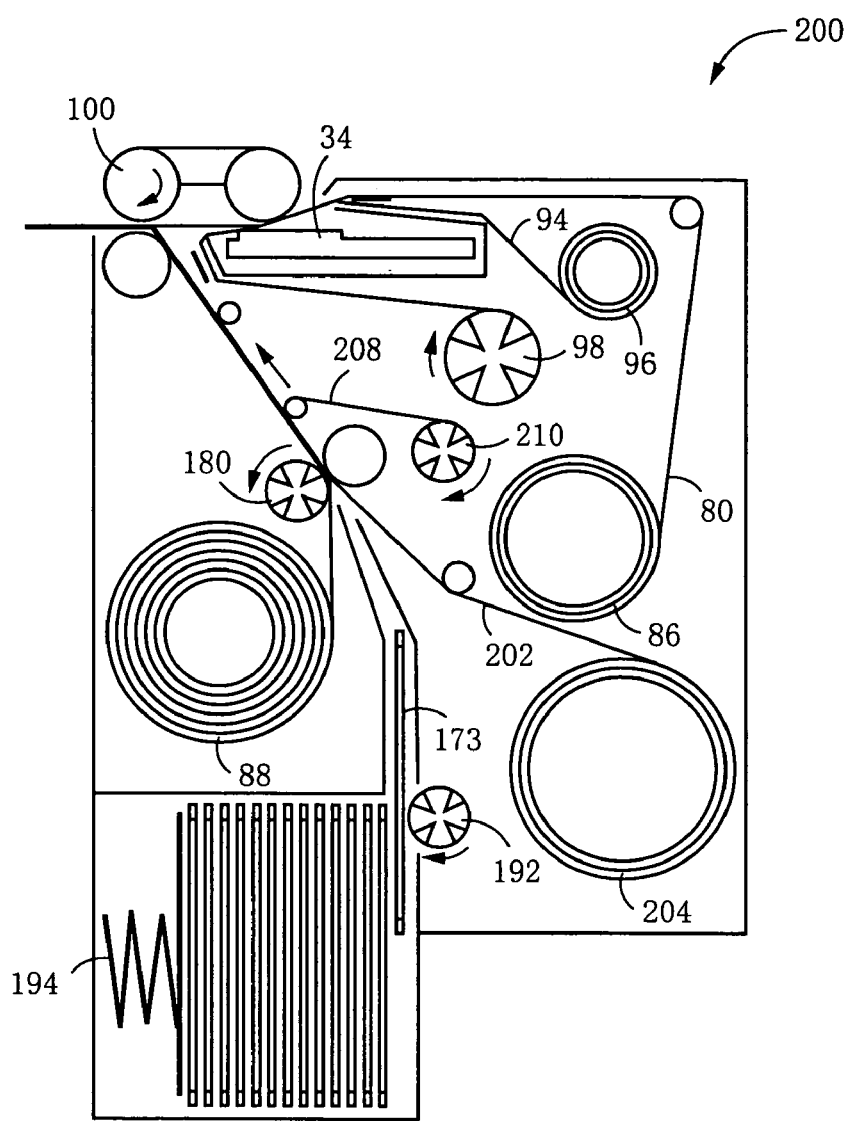
FIG. 55 is a view showing an arrangement of a cartridge constructed according to a fifth embodiment of this invention.
Figure 56:
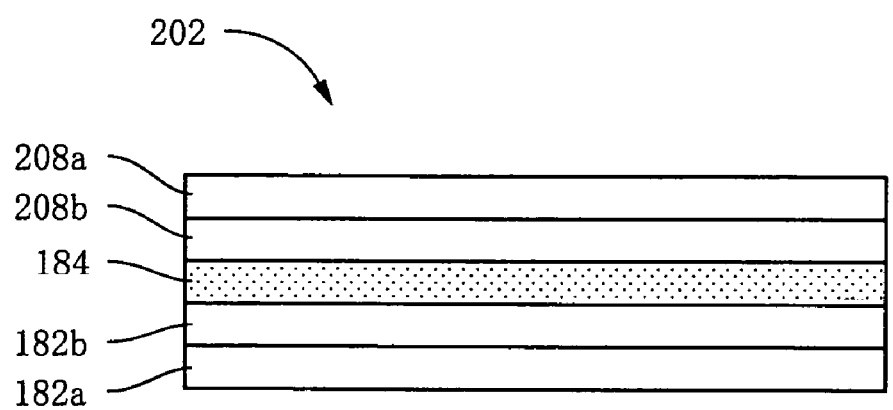
FIG. 56 is an elevational view in cross section of an intermediate substrate accommodated in the cartridge of FIG. 55.
Figure 58:
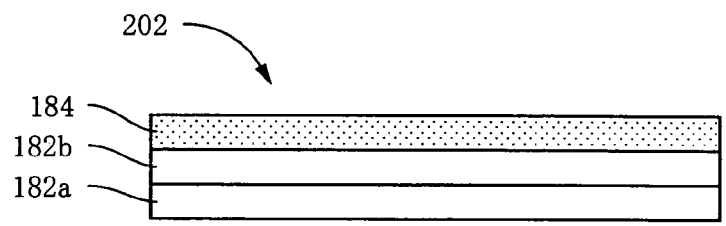
FIG. 58 is an elevational view in cross section of an intermediate substrate used in the cartridge of FIG. 55 to form the RFID tag tape.

Referring to FIG. 55, there is shown an arrangement of a cartridge 200 used in a fifth embodiment of this invention. This cartridge 200 accommodates a third roll 204 which is a roll of an intermediate substrate 202 shown in the cross sectional view of FIG. 56. The intermediate roll 202 includes a releasing layer 208 formed on the front surface of the adhesive layer 184 to be bonded to the first substrate 80. The releasing layer 208 consists of a substrate layer 208a formed of a glassine paper, for example, and a silicone layer 208b formed on the back surface of the substrate layer 208a to be bonded to the adhesive layer 184. The silicone layer 208b is removably bonded to the adhesive layer 184. The cartridge 200 further accommodates a releasing-layer take-up roller 210 for feeding the intermediate substrate 202 while removing the releasing layer 208 from the intermediate substrate 202. The cross sectional view of FIG. 58 shows the intermediate substrate 202 without the releasing layer 208. The releasing-layer take-up roller 210 is rotated by the first cartridge drive motor 30 in the direction indicated by the arrow-headed line in FIG. 55.

Figure 57:
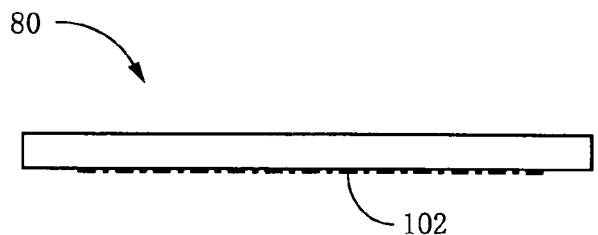
FIG. 57 is an elevational view in cross section of a first substrate used in the cartridge of FIG. 55 to form an RFID tag tape.
Figure 59:
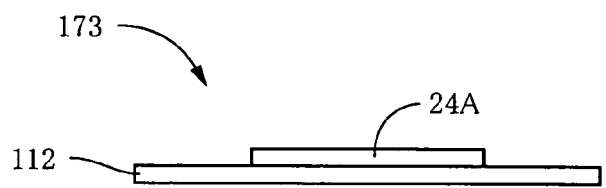
FIG. 59 is an elevational view in cross section of a circuit substrate used in the cartridge of FIG. 55 to form the RFID tag tape.
Figure 60:
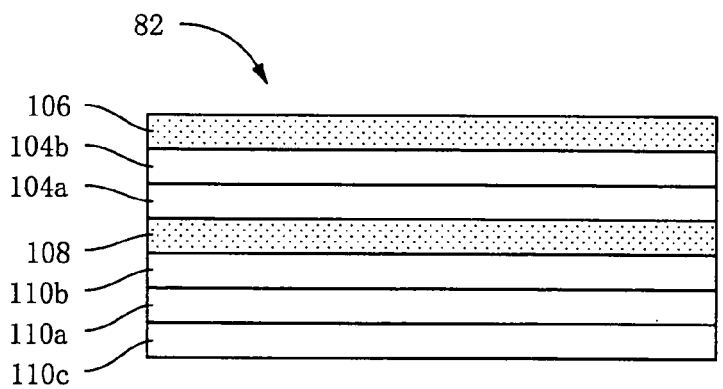
FIG. 60 is an elevational view in cross section of a second substrate used in the cartridge of FIG. 55 to form the RFID tag tape.

The cartridge 200 further accommodates the firs substrate 80 shown in the cross sectional view of FIG. 57, the pile of the planar elements 173 in the form of strips shown in the cross sectional view of FIG. 59, and the second substrate 82 shown in the cross sectional view of FIG. 60. In the cartridge 200 of FIG. 55, the second take-up roller 98, first pressure roller 100, second pressure roller 180 and releasing-layer take-up roller 210 are rotated by the first cartridge drive motor 30 in the directions indicated by the arrow-headed lines, to feed the second substrate 82 and the intermediate substrate 202 in the directions indicated by the arrow-headed lines, while these substrates 82, 202 are bonded together. At the same time, the releasing-layer take-up roller 210 is rotated in the direction indicated by the arrow-headed line, the releasing layer 208 is removed from the intermediate substrate 202 and wound on the releasing-layer take-up roller 210. Further, the feed roller 192 is rotated by the second cartridge drive motor 31 in the direction indicated by the arrow-headed line, to feed the uppermost circuit substrate element 173 from the pile, in the presence of a biasing force produced by the spring 194, so that the uppermost element 173 is inserted between the second substrate 82 and the intermediate substrate 202. When the leading portion of the uppermost element 173 fed from the pile has been inserted between the substrates 82 and 202, the rotation of the feed roller 192 is stopped while the second-take up roller 98 and pressure roller 100 are kept rotated, so that the element 173 is sandwiched between the second and intermediate substrates 82, 202 bonded together. The pressure roller 100 is rotated by the first cartridge drive motor 30 in the direction indicated by the arrow-headed line, in synchronization with the rotary motions of the rollers 92, 98, 192, so that the first substrate 80 on which the printed indicium 102 has been formed by the thermal head 34 is bonded to the intermediate substrate 202 through the adhesive layer 184. In the present embodiment, the second take-up roller 98, first pressure roller 100, feed roller 192, spring 194 and releasing-layer take-up roller 210 constitute the tag-tape forming apparatus. The prepared tag tape 26 is cut by the cutter 50 to obtain the RFID tag 24 which has a predetermined length and includes the antenna portion 64 and the IC circuit portion 66 formed between the first and second substrates 80, 82 bonded together. In the present embodiment, the intermediate substrate 202 in the form of the third roll 204 includes the releasing layer 208 covering the adhesive layer 184, so that the intermediate substrate 202 can be easily fed out from the third roll 204, with a relatively small force of pulling.

Figure 61:
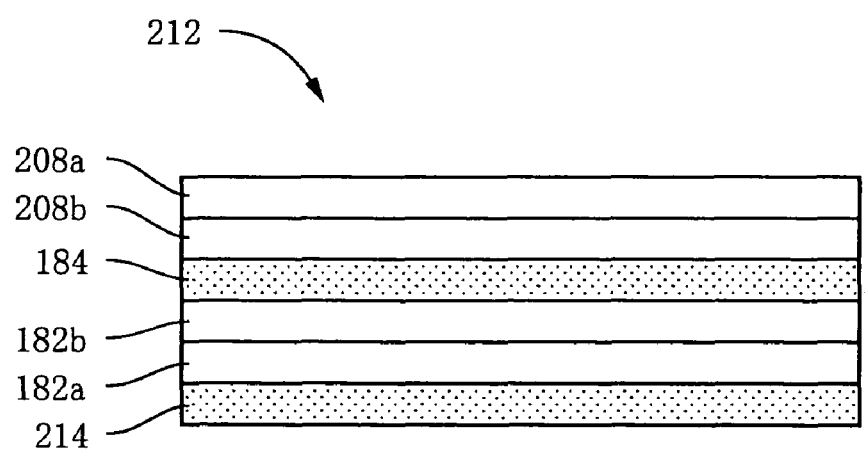
FIG. 61 is an elevational view in cross section of a modified form of the intermediate substrate accommodated in the cartridge of FIG. 55.
Figure 62:
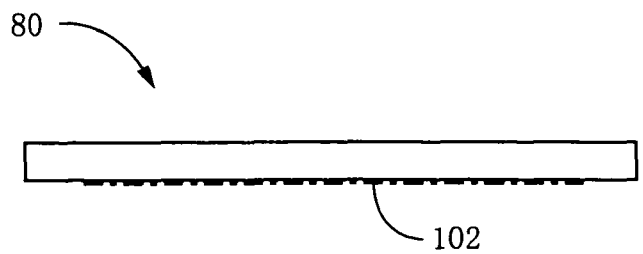
FIG. 62 is an elevational view in cross section of a first substrate used in the cartridge of FIG. 55 to form the RFID tag tape.
Figure 63:
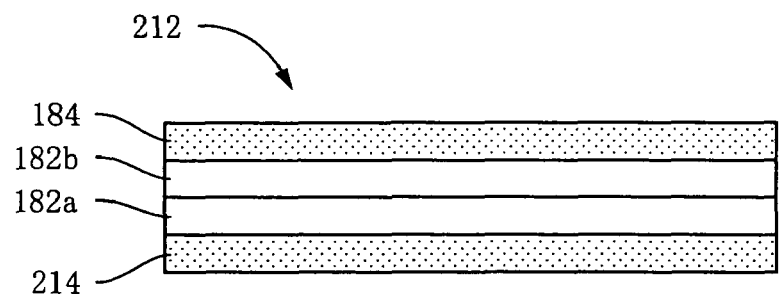
FIG. 63 is an elevational view in cross section of an intermediate substrate which is used in the cartridge of FIG. 55 to form the RFID tag tape and from which a releasing layer has been removed.
Figure 64:
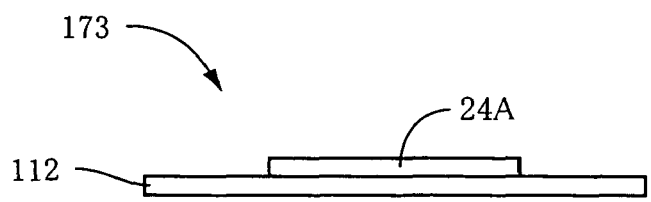
FIG. 64 is an elevational view in cross section of a circuit substrate used in the cartridge of FIG. 55 to form the RFID tag tape.
Figure 65:
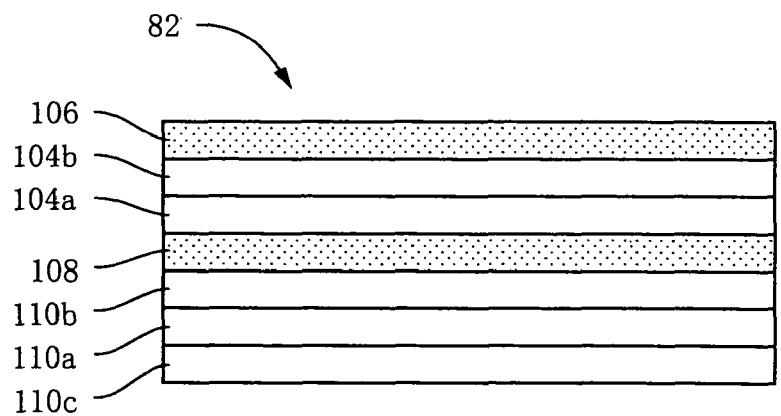
FIG. 65 is an elevational view in cross section of a second substrate used in the cartridge of FIG. 55 to form the RFID tag tape.

The cross sectional view of FIG. 61 shows a modified intermediate substrate 212 accommodated in the cartridge 200 of FIG. 55. As shown in FIG. 61, the intermediate substrate 212 includes an adhesive layer 214 formed on the back surface of the base film 182 to be bonded to the second substrate 82. The cross sectional view of FIG. 63 shows the intermediate substrate 212 after removal of the releasing layer 208. In this modification, the cartridge 200 of FIG. 55 further includes the first substrate 80 shown in the cross sectional view of FIG. 62, the pile of the planar elements 173 in the form of strips shown in the cross sectional view of FIG. 64, and the second substrate 82 shown in the cross sectional view of FIG. 65. In the present modification, the adhesive layer 210 formed on the back surface of the intermediate layer 212 and the adhesive layer 106 formed on the front surface of the second substrate 82 are bonded together, so that the strength of bonding between he second and intermediate substrates 82, 212 is effectively increased.

Sixth Embodiment

Figure 66:
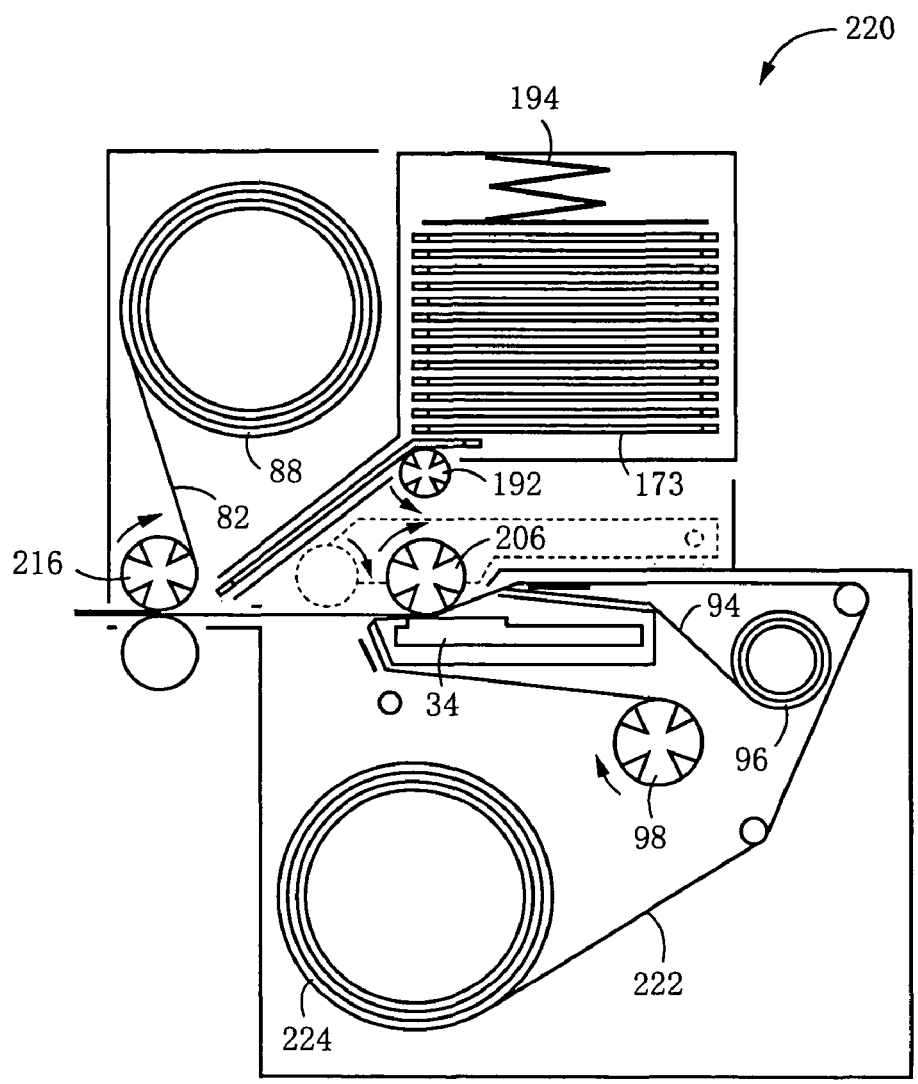
FIG. 66 is a view showing an arrangement of a cartridge constructed according to a sixth embodiment of this invention.
Figure 67:
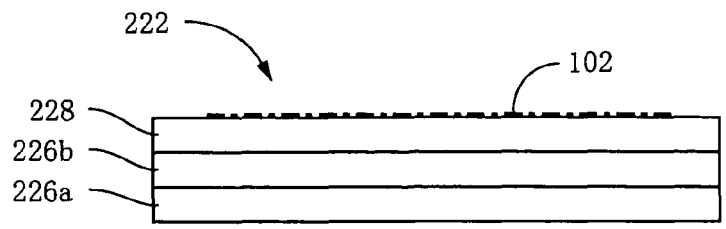
FIG. 67 is an elevational view in cross section of a first substrate accommodated in the cartridge of FIG. 66.
Figure 68:
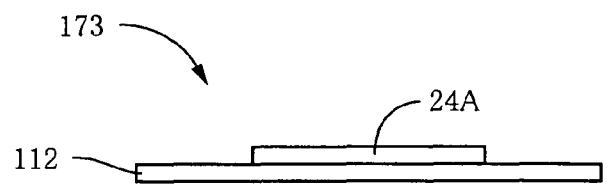
FIG. 68 is an elevational view in cross section of a circuit substrate accommodated in the cartridge of FIG. 66.
Figure 69:
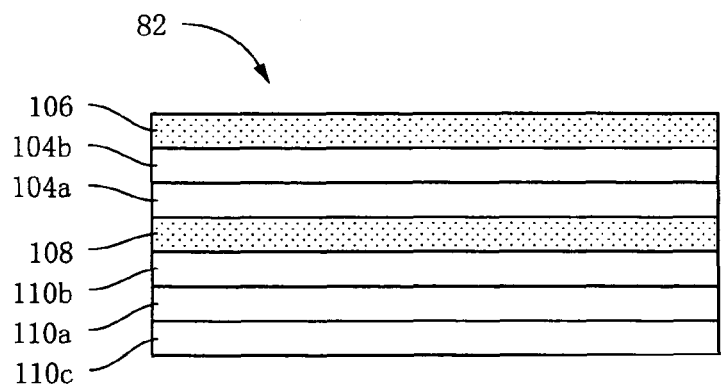
FIG. 69 is an elevational view in cross section of a second substrate accommodated in the cartridge of FIG. 66.

Referring to FIG. 66, there is shown an arrangement of a cartridge 220 used in a sixth embodiment of this invention. This cartridge 220 accommodates a first substrate 222 shown in the cross sectional view of FIG. 67, the pile of the planar elements 173 in the form of strips shown in the cross sectional view of FIG. 68, and the second substrate 82 shown in the cross sectional view of FIG. 69. The first substrate 222 takes the form of a first roll 224, and includes a tape substrate 226a formed of PET, for example, a base color layer 226b formed on the front surface of the tape substrate 226a opposed to the surface to be bonded to the second substrate 80, and an image receptive layer 228 formed on the front surface of the base color layer 226b. The image receptive layer 228 has a front surface on which the printed indicium 102 can be printed by the thermal head 34. Namely, the image receptive layer 228 is formed to easily receive the ink of the printed indicium 102 on its front surface. Thus, the cartridge 220 is used to fabricate the RFID tag of receptive type. In the cartridge 220 of the present embodiment, the printed indicium 102 is formed on the front surface of the first substrate 222 opposite to the back surface to be bonded to the second substrate 82. The color of the base color layer 226b is visible on the front side of the fabricated RFID tag 24.

In the cartridge 220 of FIG. 66, the second take-up roller 98, pressure roller 206 and second pressure roller 216 are rotated by the first cartridge drive motor 30 in the directions indicated by the arrow-headed lines, so that the first substrate 222 is forced by the pressure roller 206 onto the thermal head 34, and the printed indicium 102 is formed on the front surface of the image receptive layer 228 of the first substrate 222. At the same time, the second-take up roller 98 and second pressure roller 216 are rotated in synchronization with the rotary motion of the pressure roller 206, so that the first substrate 222 and second substrate 82 are fed in the direction indicated by the arrow-headed line, and bonded together. Further, the feed roller 192 is rotated by the second cartridge drive motor 31 in the direction indicated by the arrow-headed line, to feed the uppermost circuit substrate element 173 from the pile, in the presence of a biasing force produced by the spring 194, so that the uppermost element 173 is inserted between the first and second substrates 222, 82. When the leading portion of the uppermost element 173 fed from the pile has been inserted between the substrates 82 and 222, the rotation of the feed roller 192 is stopped while the second-take up roller 98 and second pressure roller 216 are kept rotated, so that the element 173 is sandwiched between the first and second 222, 84 bonded together. In the present embodiment, the second take-up roller 98, feed roller 192, spring 194, pressure roller 206 and second pressure roller 216 constitute the tag-tape forming apparatus. The prepared tag tape 26 is cut by the cutter 50 to obtain the RFID tag 24 of receptive type which has a predetermined length and includes the antenna portion 64 and the IC circuit portion 66 formed between the first and second substrates 222, 82 bonded together.

Figure 70:
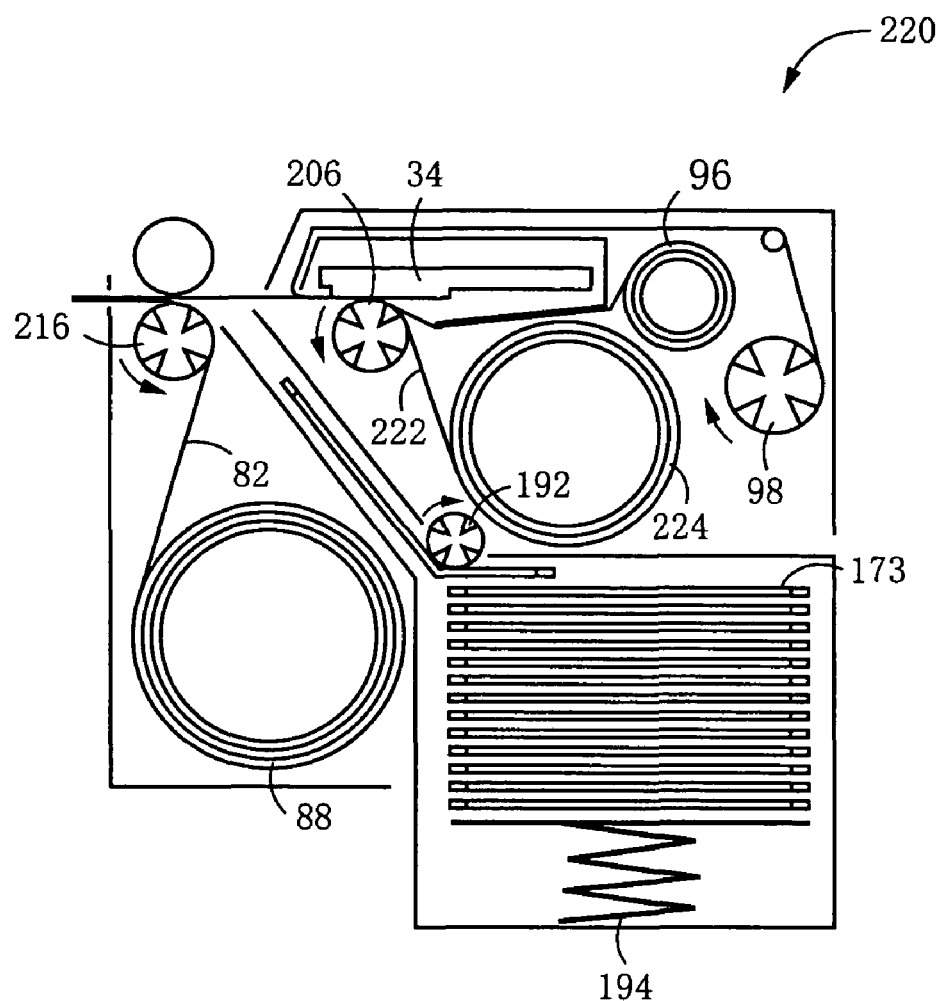
FIG. 70 is a view showing a modified form of the cartridge of FIG. 66.

The cartridge 220 may be modified such that the first roll 224, second roll 88 and the pile of planar circuit substrate elements 173 are disposed on the same side of the RFID tag 24 to be fabricated, as shown in FIG. 70. This modification makes it possible to reduce the required size of the cartridge 220.

While the preferred embodiments of this invention has been described above in detail by reference to the drawings, it is to be understood that the invention is not limited to the details of the illustrated embodiments, but may be otherwise embodied.

Figure 71:
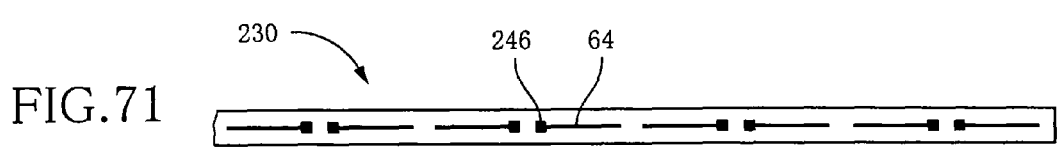
FIG. 71 is a plan view showing another example of the second substrate used by the RFID-tag fabricating apparatus of FIG. 2.
Figure 72:
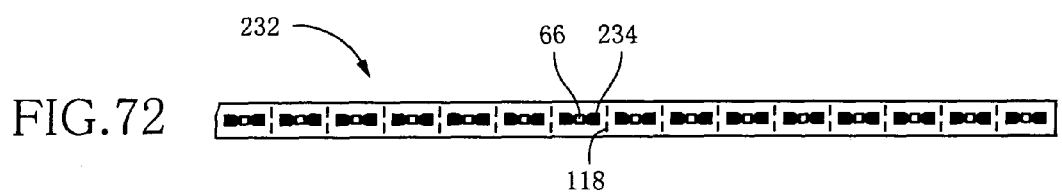
FIG. 72 is a plan view showing another example of the circuit substrate used by the RFID-tag fabricating apparatus of FIG. 2.
Figure 73:
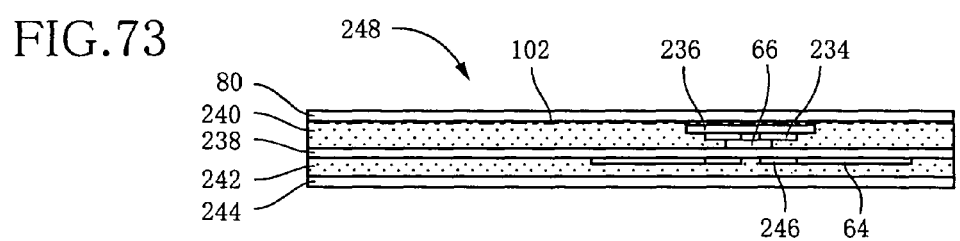
FIG. 73 is an elevational view in cross section showing an arrangement of an RFID tag fabricated from the substrates of FIGS. 71 and 72.

In the preceding embodiments, the IC circuit portions 66 formed on the circuit substrate 84 accommodated in the cartridge are electrically connected to the respective antenna portions 64 for effecting information transmission and reception in a non-contact fashion. However, the IC circuit portions 66 may be electrically connected to the respective antenna portions 64 when the tag tape 26 is formed outside the cartridge. Referring to FIGS. 71 and 72, there are respectively shown a second substrate 230 and a circuit substrate 232, which are used by the RFID-tag fabricating apparatus 12. The circuit substrate 232 carries a multiplicity of IC circuit portions 66 provided with respective connecting electrodes 234 to be electrically connected to the antenna portions 64. The IC circuit portions 66 are successively formed on the back surface of a base film 236 to be bonded to the second substrate 84, such that the IC circuit portions 66 are equally spaced apart from each other at a predetermined spacing pitch in the longitudinal direction ion of the base film 236. The base film 236 has half cuts 118 formed successively at the predetermined spacing pitch in its longitudinal direction. The second substrate 230 includes a base film 238 formed of PET, for example, an adhesive layer 240 formed on the front surface of the base film 238 to be bonded to the first substrate 80, an adhesive layer 242 formed on the back surface of the base film 238, and a releasing layer 244 removably formed on the adhesive layer 242. On the back surface of the base film 238, there are formed the antenna portions 64 provided with respective connecting electrodes 246 to be electrically connected to the respective IC circuit portions 66, such that the antenna portions 64 are equally spaced apart from each other at the predetermined spacing pitch in the longitudinal direction of the base film 238. The circuit substrate 232 is cut into segments at the half cuts 118, and the segments are inserted between the first substrate 80 and the second substrate 230 such that the connecting electrodes 246 of the antenna portions 64 are located close to the connecting electrodes 234 of the corresponding IC circuit portions 66. Since the first and second substrates 80, 230 are bonded together, the connecting electrodes 246 of the antenna portions 64 and the connecting electrodes 234 of the IC circuit portions 66 are electrically connected to each other by capacitive coupling, so that the antenna portion 64 and the corresponding IC circuit portion 66 constitute the RFID tag circuit 24A. The tag tape thus formed is cut into RFID tags 248 each having a predetermined length, as shown in FIG. 73. The connecting electrodes 246 of the antenna portions 64 and the connecting electrodes 234 of the IC circuit portions 66 may be connected to each other by direct contact with each other.

In the modified embodiment of FIGS. 71-73 wherein the IC circuit portions 66 formed on the circuit substrate 232 are provided with the respective connecting electrodes 234 to be electrically connected to the respective antenna portions 64, while the antenna portions 74 are successively formed on the second substrate 230 at the predetermined spacing pitch, the cut segments of the circuit substrate 232 are inserted between the first and second substrates 80, 230 bonded together, at a predetermined spacing pitch, to form the tag tape. The RFID tag 248 can be given a desired length by removing a selected length portion of the tag tape in which the IC circuit portion 66 is not formed, or without removing any length portion of the tag tape.

In the first embodiment, for example, the cartridge 28 accommodates the circuit substrate 84 carrying the RFID tag circuits 24A. However, another circuit substrate may be disposed at a suitable position outside the cartridge 28, within the RFID-tag fabricating apparatus 12. This additional circuit substrate permits adjustment of the number of supply of the RFID tag circuits 24A, where the RFID tags or labels not having the RFID tag circuits are selectively fabricated.

In the illustrated embodiments, the circuit substrate 84, for example, has the half cuts 118 or lines of perforations 120 at which the circuit substrate 84 is cut into segments by pulling it in the longitudinal direction. However, the circuit substrate 84 may be cut into segments by a suitable cutting device.

In the RFID-tag fabricating apparatus 12 according to the illustrated embodiments, desired information is written on the RFID tag circuits 24A on the tag tape 26 while the tag tape 26 is held stationary, and then the tag tape 26 is cut into the RFID tags 24. However, the information may be written on the RFID tag circuits 24A while the tag tape 26 is being fed. Alternatively, the information may be written on the RFID tag circuit 24A on each RFID tag 24 fabricating by cutting the tag tape 26.

Although each RFID tag circuit 24A includes the antenna portion 64 in the form of a linear element, the antenna portion 64 may be of any other type such as a loop antenna, a microstrip antenna, or a Yagi antenna, which is selected depending upon the type of the RFID tag to be fabricated.

It is to be understood that the present invention may be embodied with various other changes or modifications, which may occur to those skilled in the art, without departing from the spirit of the invention.

What is claimed is:

1. An RFID-tag fabricating apparatus for fabricating an RFID tag provided with an IC circuit portion operable to store desired information, said RFID-tag fabricating apparatus comprising:
a substrate-accommodating device for accommodating a first substrate in the form of a tape having a printable surface, and a second substrate in the form of a tape to be bonded to said first substrate;
a printing device operable to form a predetermined printed indicium on said printable surface of the first substrate;
a tag-tape forming device operable to form a tag tape, by bonding together said first and second substrates such that a plurality of IC circuit portions are interposed between the first and second substrates;
a tag-tape cutting device operable to cut said tag tape formed by said tag-tape forming device; and
a tag-tape cutting control portion operable to change a length of a segment of said tag tape to be obtained as the RFID tag by cutting of the tag tape by said tag-tape cutting device, on the basis of a length of said printed indicium formed on said first substrate, and such that said segment includes at least one of said plurality of IC circuit portions.

2. The RFID-tag fabricating apparatus according to claim 1, further comprising:
a circuit-formation judging portion operable to determine whether at least one RFID tag circuit is interposed between said first and second substrates; and
a tag-tape-formation control portion operable to control said tag-tape forming device such that at least one RFID tag circuit is not interposed between the first and second substrates, when said circuit-formation judging portion does not determine that at least one RFID tag circuit is interposed between the first and second substrates.

3. The RFID-tag fabricating apparatus according to claim 1, wherein said second substrate is bonded at one of its opposite surfaces to said first substrate, and includes an adhesive layer and a releasing layer formed on the other of said opposite surfaces.

4. The RFID-tag fabricating apparatus according to claim 1, wherein said substrate-accommodating device further accommodates a circuit substrate in the form of at least one planar member carrying a multiplicity of said IC circuit portions, and said tag-tape forming device is arranged to interpose said circuit substrate between said first and second substrates such that at least one of said IC circuit portions is included in each of segments of said circuit substrate which are separated from each other.

5. The RFID-tag fabricating apparatus according to claim 4, wherein said circuit substrate has lines of perforations arranged at a predetermined spacing pitch in its longitudinal direction.

6. The RFID-tag fabricating apparatus according to claim 4, wherein said circuit substrate has half cuts arranged at a predetermined spacing pitch in its longitudinal direction.

7. The RFID-tag fabricating apparatus according to claim 4, wherein said circuit substrate takes the form of a roll of a single tape carrying said multiplicity of IC circuit portions successively arranged at a predetermined pitch in its longitudinal direction.

8. The RFID-tag fabricating apparatus according to claim 4, wherein said circuit substrate takes the form of a pile of multiple zigzag folds of a single tape carrying said multiplicity of IC circuit portions successively arranged at a predetermined pitch in its longitudinal direction.

9. The RFID-tag fabricating apparatus according to claim 4, wherein said circuit substrate takes the form of a pile of planar elements which are superposed on each other and each of which includes at least one of said multiplicity of IC circuit portions.

10. The RFID-tag fabricating apparatus according to claim 4, wherein a surface of said second substrate to be bonded to said first substrate and a surface of said circuit substrate opposed to said first substrate have the same color.

11. The RFID-tag fabricating apparatus according to claim 4, wherein a surface of said second substrate to be bonded to said first substrate and a surface of said circuit substrate opposed to said first substrate have respective different colors.

12. The RFID-tag fabricating apparatus according to claim 4, wherein said first substrate, said second substrate and said circuit substrate have the same width dimension.

13. The RFID-tag fabricating apparatus according to claim 4, wherein said circuit substrate has a width dimension smaller than that of said first and second substrates.

14. The RFID-tag fabricating apparatus according to claim 4, wherein each of said IC circuit portions is provided with an antenna portion capable of information transmission and reception in a non-contact manner.

15. The RFID-tag fabricating apparatus according to claim 4, wherein said IC circuit portions of said circuit substrate are provided with respective connecting electrodes to be electrically connected to respective antenna portions which are capable of effecting information transmission and reception and which are formed on said first substrate or second substrate at a predetermined spacing pitch in its longitudinal direction.

16. The RFID-tag fabricating apparatus according to 1, wherein said substrate-accommodating device further accommodates a circuit substrate carrying a multiplicity of mutually separate RFID tag circuits each including said IC circuit portion and an antenna portion which is electrically connected to said IC circuit portion and which is capable of effecting information transmission and reception.

17. The RFID-tag fabricating apparatus according to claim 1, wherein said substrate-accommodating device further accommodates an intermediate substrate to be inserted between said first substrate and said circuit substrate.

18. A cartridge removably mounted on the RFID-tag fabricating apparatus defined in claim 1, as said substrate-accommodating device, said cartridge accommodating said first substrate in the form of the tape having said printable surface, and said second substrate in the form of the tape to be bonded to said first substrate.

19. The cartridge according to claim 18, wherein said second substrate is bonded at one of its opposite surfaces to said first substrate, and includes an adhesive layer and a releasing layer formed on the other of said opposite surfaces.

20. The cartridge according to claim 18, which further accommodates a circuit substrate in the form of at least one planar member carrying a multiplicity of said IC circuit portions.

21. The cartridge according to claim 20, wherein said circuit substrate has lines of perforations arranged at a predetermined spacing pitch in its longitudinal direction.

22. The cartridge according to claim 20, wherein said circuit substrate has half cuts arranged at a predetermined spacing pitch in its longitudinal direction.

23. The cartridge according to claim 20, wherein said circuit substrate takes the form of a roll of a single tape carrying said multiplicity of IC circuit portions successively arranged at a predetermined pitch in its longitudinal direction.

24. The cartridge according to claim 20, wherein said circuit substrate takes the form of a pile of multiple zigzag folds of a single tape carrying said multiplicity of IC circuit portions successively arranged at a predetermined pitch in its longitudinal direction.

25. The cartridge according to claim 20, said circuit substrate takes the form of a pile of planar elements which are superposed on each other and each of which includes at least one of said multiplicity of IC circuit portions.

26. The cartridge according to claim 20, wherein a surface of said second substrate to be bonded to said first substrate and a surface of said circuit substrate opposed to said first substrate have the same color.

27. The cartridge according to claim 20, wherein a surface of said second substrate to be bonded to said first substrate and a surface of said circuit substrate opposed to said first substrate have respective different colors.

28. The cartridge according to claim 20, wherein said first substrate, said second substrate and said circuit substrate have the same width dimension.

29. The RFID-tag fabricating apparatus according to claim 20, wherein said circuit substrate has a width dimension smaller than that of said first and second substrates.

30. The cartridge according to claim 20, wherein each of said IC circuit portions is provided with an antenna portion capable of information transmission and reception in a non-contact manner.

31. The cartridge according to claim 20, wherein said IC circuit portions of said circuit substrate are provided with respective connecting electrodes to be electrically connected to respective antenna portions which are capable of effecting information transmission and reception and which are formed on said first substrate or second substrate at a predetermined spacing pitch in its longitudinal direction.

32. The cartridge according to 18, which further accommodates a circuit substrate carrying a multiplicity of mutually separate RFID tag circuits each including said IC circuit portion and an antenna portion which is electrically connected to said IC circuit portion and which is capable of effecting information transmission and reception.

33. The cartridge according to claim 18, which further accommodates an intermediate substrate to be inserted between said first substrate and said circuit substrate.

* * * * *